(12) United States Patent
Sakai et al.

(10) Patent No.: US 8,540,581 B2
(45) Date of Patent: Sep. 24, 2013

(54) SLIDING TYPE TRIPOD CONSTANT VELOCITY JOINT

(75) Inventors: Yoshinari Sakai, Takahama (JP); Tatsuya Yoshii, Kashihara (JP); Koichiro Mizuno, Kashiwara (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 0 days.

(21) Appl. No.: 12/737,243

(22) PCT Filed: Jun. 23, 2009

(86) PCT No.: PCT/JP2009/061411
§ 371 (c)(1),
(2), (4) Date: Dec. 22, 2010

(87) PCT Pub. No.: WO2009/157448
PCT Pub. Date: Dec. 30, 2009

(65) Prior Publication Data
US 2011/0092298 A1    Apr. 21, 2011

(30) Foreign Application Priority Data

Jun. 24, 2008 (JP) ............... P2008-164967
Jun. 24, 2008 (JP) ............... P2008-164978
Jun. 24, 2008 (JP) ............... P2008-165016

(51) Int. Cl.
*F16D 3/205* (2006.01)

(52) U.S. Cl.
USPC .......................... 464/111; 464/905

(58) Field of Classification Search
USPC ........... 464/111, 120–123, 132, 905; 384/44, 384/45, 50, 51, 55
See application file for complete search history.

(56) References Cited

U.S. PATENT DOCUMENTS

| | | | |
|---|---|---|---|
| 2,528,987 A | * | 11/1950 | Albett |
| 4,729,670 A | | 3/1988 | Murphy et al. |
| 4,768,990 A | | 9/1988 | Farrell et al. |
| 4,828,534 A | | 5/1989 | Orain |

(Continued)

FOREIGN PATENT DOCUMENTS

| | | |
|---|---|---|
| GB | 2 199 638 A | 7/1988 |
| JP | 59-40016 | 3/1984 |

(Continued)

OTHER PUBLICATIONS

European Search Report dated Oct. 17, 2012.

(Continued)

*Primary Examiner* — Gregory Binda
*Assistant Examiner* — Josh Skroupa
(74) *Attorney, Agent, or Firm* — McGinn IP Law Group, PLLC

(57) ABSTRACT

A sliding type tripod constant velocity joint includes a pair of intermediate members arranged so as to sandwich a tripod shaft part from both sides of side surfaces of a raceway groove of an outer ring and to provide so as to be oscillated relative to the tripod shaft part. The sliding type tripod constant velocity joint further includes a plurality of rolling elements provided between side surfaces of the raceway groove and power transmission surfaces of the intermediate members opposing the side surfaces of the raceway grooves and a cage that supports the rolling elements such that the rolling elements circulate on outer peripheries of the intermediate members.

8 Claims, 20 Drawing Sheets

(56) References Cited

U.S. PATENT DOCUMENTS

| | | | |
|---|---|---|---|
| 5,073,144 A * | 12/1991 | Stenglein et al. | 464/111 |
| 5,169,239 A | 12/1992 | Schneider | |
| 5,199,925 A | 4/1993 | Welschof | |
| 6,165,075 A * | 12/2000 | Kita et al. | 464/111 |
| 6,174,239 B1 | 1/2001 | Guimbretiere | |
| 6,533,668 B2 | 3/2003 | Mizukoshi et al. | |
| 6,736,730 B2 | 5/2004 | Sugiyama et al. | |
| 6,918,836 B2 * | 7/2005 | Henkel et al. | 464/111 |
| 7,140,967 B2 * | 11/2006 | Olszewski et al. | 464/111 |
| 7,462,106 B2 | 12/2008 | Kashiwagi et al. | |
| 2002/0055390 A1 | 5/2002 | Mizukoshi et al. | |
| 2002/0119894 A1 | 8/2002 | Yoshida | |
| 2010/0160051 A1 | 6/2010 | Mizuno et al. | |

FOREIGN PATENT DOCUMENTS

| | | |
|---|---|---|
| JP | 62-255616 A | 11/1987 |
| JP | 63-163031 A | 7/1988 |
| JP | 3-172622 A | 7/1991 |
| JP | 2763624 B2 | 3/1998 |
| JP | 2000-256694 A | 9/2000 |
| JP | 2002-147482 A | 5/2002 |
| JP | 3361096 B2 | 10/2002 |
| JP | 2003-65350 A | 3/2003 |
| JP | 2006-162056 A | 6/2006 |
| WO | WO 02/33276 A2 | 4/2002 |

OTHER PUBLICATIONS

Office Action dated Sep. 14, 2012, in co-pending U.S. Appl. No. 13/495,997.
Notification of Reasons for Refusal in Application No. 2008-164967 dated Dec. 11, 2012.
Notification of Reasons for Refusal in Application No. 2008-164978 dated Dec. 11, 2012.
Office Action dated Feb. 6, 2013, in co-pending U.S. Appl. No. 13/523,181.
Notice of Allowance dated Feb. 1, 2013, in co-pending U.S. Appl. No. 13/495,997.

* cited by examiner

SLIDING TYPE TRIPOD CONSTANT VELOCITY JOINT

TECHNICAL FIELD

The present invention relates to a sliding type tripod constant velocity joint.

BACKGROUND ART

As a usual sliding type tripod constant velocity joint, for instance, a sliding type tripod constant velocity joint is known that is disclosed in JP-A-2000-256694 (Patent Document 1). In the sliding type tripod constant velocity joint disclosed in Patent Document 1, a tripod shaft part has a cylindrical form, and an inner peripheral surface of a roller has a cylindrical form. In this case, the roller is constantly located coaxially with the tripod shaft part. Accordingly, when a joint angle is applied, a direction in which the roller is apt to roll on a raceway groove (a roller groove) does not correspond to a direction in which the raceway groove extends. Thus, a slide arises between the roller and the raceway groove. As result, an induced thrust force is generated in the axial direction of the joint. The induced thrust force causes the vibration of a vehicle body or noise to be generated.

Thus, in order to reduce the induced thrust force, for instance, a sliding type tripod constant velocity joint is known that is disclosed in JP-A-2006-162056 (Patent Document 2). In the sliding type tripod constant velocity joint disclosed in Patent Document 2, an outer peripheral surface of a tripod shaft part has a spherical protruding form and an inner peripheral surface of an inner roller forming a roller unit abutting thereon has a cylindrical form. Thus, since the tripod shaft part can swing relative to the roller unit so that a direction in which an outer roller forming the roller unit is liable to roll on a raceway groove may be made to constantly correspond to a direction in which the raceway groove extends, a slide can be avoided from arising between the outer roller and the raceway groove. As a result, an induced thrust force can be reduced.

Further, as other structures, structures are known that are disclosed in JP-A-63-163031 (Patent Document 3) and JP-B-2763624 (Patent Document 4). A sliding type tripod constant velocity joint disclosed in Patent Document 3 includes a pair of intermediate members provided outside a tripod shaft part and a needle arranged between the intermediate members respectively and a side surface of a raceway groove. Further, in a sliding type tripod constant velocity joint disclosed in Patent Document 4, a tubular and integral intermediate member is provided in an outer periphery of a tripod shaft part, a needle can be circulated on an outer peripheral surface of the integral intermediate member and the needle rolls along the intermediate member and the side surface of a raceway groove.

Further, as other structure, a structure is known that is disclosed in JP-A-2003-65350 (Patent Document 5). In a sliding type tripod constant velocity joint disclosed in Patent Document 5, a rolling element is a spherical element. The rolling elements are mutually positioned relative to an intermediate member and supported by a cage. When a power is transmitted in this structure, between the rolling element and the intermediate member, and between the rolling element and a raceway groove, a large resistance is generated due to a slide as well as a rolling resistance.

Thus, in order to reduce the resistance, for instance, structures are known that are disclosed in JP-B-2763624 (Patent Document 4) and JP-B-3361096 (Patent Document 6). In sliding type tripod constant velocity joints disclosed in Patent Documents 4 and 6, a rolling element is a needle and supported by a cage so as to circulate on an outer periphery of an intermediate member. Thus, a resistance between the rolling element and the intermediate member, and between the rolling element and a raceway groove due to a slide can be greatly reduced.

PRIOR ART DOCUMENTS

Patent Documents

Patent Document 1: JP-A-2000-256694
Patent Document 2: JP-A-2006-162056
Patent Document 3: JP-A-63-163031
Patent Document 4: JP-B-2763624
Patent Document 5: JP-A-2003-65350
Patent Document 6: JP-B-3361096

SUMMARY OF THE INVENTION

Problem to be Solved by the Invention

Here, in the constant velocity joint disclosed in Patent Document 2, when a joint angle is applied, the tripod shaft part slides in an axial direction of the tripod shaft part relative to the roller unit. Accordingly, in the usual sliding type tripod constant velocity joint, a position of the inner peripheral surface of the inner roller which abuts on the tripod shaft part is changed. Thus, the roller unit operates so as to swing on a direction in which the raceway groove of an outer ring extends. Accordingly, a back surface side of a part of the roller unit that transmits a power to the raceway groove of the outer ring abuts on the raceway groove to generate a frictional force between the roller unit and the raceway groove. As a result, there is a fear that the induced thrust force may be increased. Further, a clearance between the raceway groove and the roller unit may be supposed to be enlarged to prevent the abutment of the back surface side, however, in such a structure, a rotation backlash of the roller unit may be probably increased.

Further, in the constant velocity joint disclosed in Patent Document 3, when a joint angle is small, the needle rolls on the raceway groove. However, since the number of the needles is limited to the finite number in the direction in which the raceway groove extends, when the joint angle is large, the needle generates a slide relative to the raceway groove and the intermediate member. The slide induces a thrust force to be generated.

On the other hand, in the constant velocity joint disclosed in Patent Document 4, since the needle circulates, the needle rolls relative to the raceway groove and the intermediate member, so that a slide can be prevented from arising. However, since the intermediate member has an integral structure, the same problem as that in the constant velocity joint disclosed in Patent Document 2 arises. Namely, a state may be generated that in a back surface side of a part which transmits a power, the intermediate member applies a force to an outer ring through the needle. In such a way, the generation of the force in the back surface side induces to the thrust force to be generated.

Further, in the constant velocity joints disclosed in Patent Documents 4 and 6, in order to transmit a power, the form of the rolling element or the number of the rolling elements for transmitting the power at the same time is suitably set. To sufficiently transmit the power, an extending direction (an entire length) of the raceway groove of a roller unit needs to be increased to increase an abutting area of the roller unit that contributes to the transmission of the power and a side surface of the raceway groove. When the entire length of the roller unit is increased, if a joint angle is applied, since a shaft may possibly interfere with the cage of the roller unit, a maximum joint angle is restricted. When an outside diameter of an outer ring is enlarged, the maximum joint angle can be ensured, which is contrary to a request for a compact size.

Further, the cage for supporting the rolling element is requested to prevent the rolling element from falling under a state that the constant velocity joint is attached and a lubricant is requested to be assuredly stuck to the rolling element to effectively circulate the rolling element.

The present invention is made in view of such circumstances, and a first object of the present invention is to provide a sliding type tripod constant velocity joint having a structure that a member abutting on a raceway groove of an outer ring assuredly rolls on the raceway groove and even when a tripod shaft part slides in the axial direction of the tripod shaft part relative to a roller unit, a back surface side of the roller unit can be prevented from applying a large force to the raceway groove.

Further, a second object of the present invention is to provide a sliding type tripod constant velocity joint that can avoid an interference of a shaft and a roller unit when a joint angle is increased without an enlargement. A third object of the present invention is to provide a sliding type tripod constant velocity joint that can prevent a rolling element from falling under a state that the constant velocity joint is rotated.

Means for solving the Problem

A sliding type tripod constant velocity joint according to a first aspect of the present invention includes: an outer ring of a tubular form having three raceway grooves which are formed on an inner peripheral surface and which extend in a direction of a rotation axis of the outer ring; a tripod including a boss part connected to a shaft and three tripod shaft parts which are provided upright so as to extend outward in a radial direction of the boss part from an outer peripheral surface of the boss part and which are inserted into the raceway grooves, respectively; a pair of intermediate members which are arranged so as to sandwich a corresponding one of the tripod shaft parts from both sides of side surfaces of the raceway grooves and which are provided so as to be oscillated relative to the corresponding one of the tripod shaft parts; a plurality of rolling elements provided between the side surfaces of a corresponding one of the raceway grooves and power transmission surfaces of the pair of intermediate members opposing the side surfaces to the corresponding one of the raceway grooves so as to roll along the side surfaces of the corresponding one of the raceway grooves; and a cage that supports the rolling elements such that the rolling elements circulate on outer peripheries of the pair of intermediate members.

According to the first aspect, since the rolling elements circulate on the outer peripheries of the pair of intermediate members such that the rolling elements roll along the raceway grooves, members that abut on the raceway grooves of the outer ring assuredly roll relative to the raceway grooves. Accordingly, since the members that abut on the raceway grooves of the outer ring can be prevented from sliding relative to the raceway grooves; an induced thrust force caused thereby can be prevented from being generated.

Further, in the roller unit of the constant velocity joint disclosed in the Patent Documents 2 and 4, since during a power transmission, the tripod shaft parts slide so that a position of the inner peripheral surface of the inner roller which abuts on the tripod shaft parts changes, the roller unit is oscillated together in the direction in which the raceway grooves of an outer ring extend to abut on the raceway grooves in the back surface side of a part of the power transmission. Thus, the above-described problem arises.

As compared therewith, the present invention includes the one pair of intermediate members arranged so as to sandwich the tripod shaft parts between them and provided so as to be oscillated relative to the tripod shaft parts. Namely, the one pair of intermediate members are respectively independent. In such a way, even when a load position is changed by the tripod shaft parts, which arises in a power transmission side, an operation of the intermediate member of the power transmission side does not give an influence to the operation of the intermediate member of the back surface side. Accordingly, since the back surface side of the roller unit can be prevented from applying a large force to the raceway grooves, the generation of the induced thrust force can be greatly reduced.

Here, the "roller unit" includes members that transmit a power from the tripod shaft parts to the raceway grooves. For instance, the roller unit in the tripod constant velocity joint disclosed in Patent Document 2 includes an inner roller, an outer roller, a roller support member and a snap ring. The roller unit in the tripod constant velocity joint of the present invention includes the intermediate member, the rolling elements and the cage.

According to a second aspect of the present invention, in the sliding type tripod constant velocity joint of the first aspect, an outer peripheral surface of each of the tripod shaft parts has a spherically protruding shape. Under a state where a rotation axis of the outer ring coincides with a rotation axis of the shaft, a tripod PCR may be preferably set to be larger than an outer ring PCR, where the tripod PCR is a distance between: a point on a tripod axis intersecting a plane which passes through a center of width of the rolling element along the tripod axis and which is orthogonal to the tripod axis; and the rotation axis of the outer ring, and where the tripod PCR is a distance between: a center of curvature of the outer peripheral surfaces of the tripod shaft parts; and the rotation axis of the shaft.

Here, if the outer ring PCR (pitch circle radius) is set to coincides with the tripod PCR (pitch circle radius) under a position that the rotation axis of the outer ring coincides with the rotation axis of the shaft, when the power is transmitted by applying a joint angle, a contact area of the tripod shaft parts and the roller unit slides in the direction of width of the roller unit and a center of the sliding width is located inside in the radial direction of the outer ring relative to the roller unit. Therefore, for instance, when a spherical member is applied to the rolling element, there is a fear that as the load position of the tripod shaft parts to the roller unit separates more from the center of width of the roller unit, a rotation backlash may be more increased. Further, when a needle is applied to the rolling element, there is a fear that a partial abrasion of the needle may arise.

Thus, the tripod PCR is set to be larger than the outer ring PCR. Thus, when the power is transmitted by applying a prescribed joint angle, the center of the sliding width of the contact area of the tripod shaft parts and the roller unit can be located in the vicinity of a center in the radial direction of the outer ring relative to the roller unit. As a result, the rotation backlash can be reduced and the partial abrasion of the rolling element such as the needle can be prevented. However, as compared with a case that the tripod PCR coincides with the outer ring PCR, when the tripod PCR is larger than the outer ring PCR, the load position of the tripod shaft parts to the roller unit is located outside in the radial direction of the outer ring. Accordingly, a possibility is increased that the roller unit comes into contact with the raceway grooves of the outer ring in the back surface side of the power transmission. However, since the one pair of intermediate members are independent, the contact of the raceway grooves and the roller unit can be avoided without increasing a clearance between the raceway grooves and the roller unit in the back surface side of the power transmission.

According to a third aspect of the present invention, in the sliding type tripod constant velocity joint of the first aspect or the second aspect, the pair of intermediate members have intermediate introducing surfaces which are smooth with respect to the power transmission surfaces so as to smoothly contact and guide the circulating rolling elements to the power transmission surfaces.

Here, a member of a side of the one pair of intermediate members that transmits the power is positioned relative to the tripod shaft parts and the outer ring. On the other hand, since the cage is a member that does not contribute to the power transmission, a position of the cage is not stable. Accordingly, the rolling elements are not easily allowed to enter the power transmission surfaces of the intermediate members in a prescribed position from the cage whose position is not stabilized. Thus, the power transmission surfaces of the intermediate members and the intermediate member introducing surfaces for allowing the rolling elements to enter the power transmission surfaces are formed with the same member, so that the positions of the rolling elements entering the power transmission surfaces can be stably adjusted.

According to a fourth aspect of the present invention, in the sliding type tripod constant velocity joint of the third aspect, a circulating path as a track of the rolling elements circulated in the cage includes: a first circulating path where the rolling elements move on the power transmission surfaces and which is defined along the power transmission surfaces; a second circulating path where the rolling elements move on the intermediate member introducing surfaces and which is defined along the intermediate member introducing surfaces and is smoothly connected to the first circulating path; and a third circulating path smoothly connected to side end parts of the second circulating path opposite to the first circulating path.

Here, since the intermediate member introducing surface are not parts that transmit the power between the raceway grooves and the intermediate member introducing surfaces, a very large load is not applied to the rolling elements moving on the intermediate member introducing surfaces. Accordingly, the rolling elements can be allowed to stably enter the second circulating path defined along the intermediate member introducing surfaces from the third circulating path. As a result, the rolling elements can be smoothly moved from the third circulating path to the second circulating path, and further, from the second circulating path to the first circulating path defined along the power transmission surfaces.

According to a fifth aspect of the present invention, in the sliding type tripod constant velocity joint of any one of the first to fourth aspects, the cage may not be regulated in a power transmitting direction relative to the one pair of intermediate members.

For instance, clearances are provided between all surfaces (including the power transmission surfaces and the intermediate member introducing surfaces) of the one pair of intermediate members opposed to the side surfaces of the raceway grooves and the cage. Thus, the cage can prevent the rolling elements from acting so as to apply a force to the raceway grooves of the outer ring in the back surface side of the power transmission. Accordingly, the above-described effects can be assuredly achieved.

According to a sixth aspect of the present invention, in the sliding type tripod constant velocity joint of any one of the first to fifth aspects, the outer peripheral surfaces of the tripod shaft parts have the spherically protruding shapes, and the inner surfaces of the one pair of intermediate members are fitted to the outer peripheral surfaces of the tripod shaft parts.

Since the one pair of intermediate members are spherically fitted to the tripod shaft parts so as to be oscillated, a load (face pressure) per unit area of the intermediate members can be reduced to improve the durability of the intermediate members. Further, since the intermediate members follow the sliding tripod shaft parts, the positions thereof can be fixed relative to the tripod shaft parts to stably transmit the power. Further, in the present invention, since the one pair of intermediate members are arranged so as to sandwich the tripod shaft parts between them, the inner surfaces thereof can be easily formed in entirely spherically recessed shapes. Accordingly, power transmission areas of the tripod shaft parts and the one pair of intermediate members can be increased. Further, when the tripod shaft parts come into angular contact with the intermediate members, two points of the angular contact are further spaced to be stabilized.

According to a seventh aspect of the present invention, in the sliding type tripod constant velocity joint of any one of the first to fifth aspects, the rolling element is a cylindrical needle. Under a state where a rotation axis of the outer ring coincides with a rotation axis of the shaft, the cage may support the needle such that a cylindrical axial direction of the needle is parallel to an axial direction of the tripod, and such that the pair of intermediate members may form the power transmission surfaces which can slide in a radial direction of the outer ring relative to the needle.

Thus, since the needles abut on the side surfaces of the raceway grooves of the outer ring along the cylindrical axial direction to transmit the power, in the roller unit, the rotation backlash is low as a whole so that the power may be stably transmitted.

According to an eighth aspect of the present invention, in the sliding type tripod constant velocity joint of any one the first to fifth aspects, the rolling element is a spherical or barrel shaped roller, and under a state that a rotation axis of the outer ring coincides with a rotation axis of the shaft, the pair of intermediate members may be provided with the power transmission surfaces which can be oscillated in a radial direction of the outer ring relative to the rolling elements.

When the rolling element has the spherical shape, since the rolling element is simple in its form and high in its rigidity and can be most smoothly circulated, the rolling element can stably transmit even a large power. Further, when the rolling element is the barrel shaped roller, since a width in the direction orthogonal to the tripod axis can be decreased more than that of the spherical rolling element, an entire width of the roller unit can be reduced. Further, when the intermediate members can be oscillated in the radial direction of the outer ring relative to the rolling elements, the intermediate members can transmit the power to the rolling elements depending on the position of the sliding tripod shaft parts. Here, the barrel shaped roller is the rolling element that has a pillar shape and in which a section cut in the direction orthogonal to the extending direction of the pillar is circular and a part corresponding to an outer peripheral surface in a section cut in the extending direction of the pillar has a circular arc protruding shape.

A sliding type tripod constant velocity joint according to a ninth aspect of the present invention includes: an outer ring of a tubular form having three raceway grooves which are formed on an inner peripheral surface and which extend in a direction of a rotation axis of the outer ring; a tripod including a boss part connected to a shaft and three tripod shaft parts which are provided upright so as to extend outward in a radial direction of the boss part from an outer peripheral surface of the boss part and which are inserted into the raceway grooves, respectively; an intermediate member which is provided on an outer periphery of a corresponding one of the tripod shaft parts so as to be oscillated relative to the corresponding one of the tripod shaft parts and which has power transmission surfaces on both side surfaces and opposing the side surfaces of a corresponding one of the raceway grooves; a plurality of rolling elements provided between the side surfaces of the corresponding one of the raceway grooves and the power transmission surfaces so as to roll along the side surfaces of the corresponding one of the raceway grooves; and a cage that supports the rolling elements such that the rolling elements circulate on an outer periphery of the intermediate member, wherein the cage includes: a first circulating path which is located between one of the power transmission surfaces and one of the side surfaces of the corresponding one of the raceway grooves and which supports the rolling elements; a second circulating path which is located between the other of the power transmission surfaces and the other of the side surfaces of the corresponding one of the raceway grooves and which supports the rolling elements; a third circulating path which connects one ends of the first and second circulating paths located in an opening side of the outer ring and which is formed to be bent in at least in one direction of a radially outward direction of the outer ring and a direction toward the tripod shaft parts so as to have a protruding shape; and a fourth circulating path which connects the other ends of the first and second circulating paths which are located in the interior side of the outer ring.

According to the present invention, since the third circulating path is formed to be bent in a protruding shape at least in one direction of the radially outward direction of the outer ring and the direction toward the tripod shaft parts, under a position where when the joint angle is applied to transmit the power, the shaft comes closest to the cage, a distance of both the members is more increased than in a usual device. Accordingly, a maximum joint angle can be increased. Further, in such a structure, since a positional relation between the roller unit and the tripod shaft parts is not changed, the maximum joint angle can be increased without enlarging the outside diameter of the outer ring. Therefore, an entire part of the constant velocity joint is not enlarged and the above-described effects can be achieved.

Here, especially, the case that the third circulating path is bent in the protruding shape outward in the radial direction of the outer ring will be described in detail. A circulating locus of the rolling elements when the roller unit is seen from the side surfaces of the raceway grooves smoothly comes close linearly or in a circular arc shape to circulating loci in the first and second circulating paths toward the bottom surfaces of the raceway grooves. Accordingly, since the circulating locus is changed with a low resistance to an inertia force acting on the circulating rolling elements, the smooth circulation of the rolling element is maintained and the maximum joint angle can be increased.

Further, especially, the case that the third circulating path is bent in the protruding shape in the direction toward the tripod shaft parts will be described in detail. A circulating locus of the rolling elements when the roller unit is seen from the side surfaces of the raceway grooves is not inclined to circulating loci in the first and second circulating paths. Namely, since the circulating loci is formed so as to be located in the same plane over an entire circumference, even in other rolling elements than a spherical member which hardly roll on an inclination, the maximum joint angle can be increased.

Further, the case that the third circulating path is bent in protruding shapes in both the directions of the radially outward direction of the outer ring and the direction toward the tripod shaft parts. In order to bend the circulating path in the protruding shape outward in the radial direction of the outer ring, a clearance from the roller unit to the bottom surfaces of the raceway grooves is necessary. However, even when the clearance is small, and accordingly, a sufficient bent part cannot be formed, the circulating path may be bent in the protruding shape in the direction toward to the tripod shaft parts. Thus, the contact of the shaft and the cage can be avoided and the maximum joint angle can be increased.

According to a tenth aspect of the invention, in the sliding type tripod constant velocity joint of the first aspect, a central part in a circumferential direction of the outer ring in the third circulating path is most bent in at least in one direction of the radially outward direction of the outer ring and the direction toward the tripod shaft parts so as to have the protruding shape.

Thus, when the third circulating path is most bent in the protruding shape at least in one direction of the radially outward direction of the outer ring and the direction toward the tripod shaft parts, the circulating locus of the rolling elements in the third circulating path is formed so as to be symmetrical with respect to the tripod axis when the third circulating path is seen from the direction of the rotation axis of the outer ring. Thus, the circulating path can be formed so that even when a direction in which the rolling elements of the roller unit reciprocating on the raceway grooves are circulated is reversed when the power is transmitted, the rolling elements are supported by the cage similarly to a state before the reversing operation, a stable circulation is held and the maximum joint angle is increased According to an eleventh aspect of the present invention, in the sliding type tripod constant velocity joint of the tenth aspect, the first, second, third and fourth circulating paths have opening parts over an entire length in an outer peripheral side of the cage, and widths of the opening parts of the third and fourth circulating paths may be narrower than widths of the opening parts of the first and second circulating paths.

Here, the opening parts of the first and second circulating paths are preferably formed to be large so that the cage which supports the rolling elements to be circulated supports the rolling elements in the power transmission part and does not block the power transmission of the rolling elements and the side surfaces of the raceway grooves. On the other hand, in order to prevent thee rolling elements from falling under a state the constant velocity joint is attached, the width of the opening parts of the third and fourth circulating paths is preferably set to be narrower than the width of the opening parts of the first ands second circulating paths. On the rolling elements circulating on the third and fourth circulating paths, a large inertia force is exerted in the direction of the rotation axis of the outer ring and other member for regulating the inertia force is not provided. Accordingly, when the width of the opening parts of the third and fourth circulating paths is enlarged, there is a fear that when the inertia force acting on the rolling elements is large, the rolling elements may possibly fall from the cage. Thus, the width of the opening parts in the third and fourth circulating paths is suitably set to be narrower than the width of the opening parts of the first and second circulating paths. Thus, the circulation of the rolling elements is not blocked and the rolling elements can be prevented from falling from the cage.

According to a twelfth aspect of the present invention, in the sliding type tripod constant velocity joint of any one of the ninth to eleventh aspects, the third and fourth circulating paths are formed to be symmetrical with respect to the corresponding one of the tripod shaft parts.

Thus, since the form obtained by bending the third and fourth circulating paths in the protruding shapes or the form obtained by narrowing the width of the opening parts is a symmetrical form with respect to the tripod shaft parts, there is no difference as members between the first and second circulating paths, and third and fourth circulating paths. Accordingly, during the attachment of the constant velocity joint, an erroneous attachment such as an attachment opposite to an initial design can be prevented.

A sliding type tripod constant velocity joint according to a thirteenth aspect of the present invention includes: an outer ring of a tubular form having three raceway grooves which are formed on an inner peripheral surface and which extend in a direction of a rotation axis of the outer ring; a tripod including a boss part connected to a shaft and three tripod shaft parts which are provided upright so as to extend outward in a radial direction of the boss part from an outer peripheral surface of the boss part and which are inserted into the raceway grooves, respectively; an intermediate member which is provided on an outer periphery of a corresponding one of the tripod shaft parts so as to be oscillated relative to the corresponding one of the tripod shaft parts and which has power transmission surfaces on both side surfaces and opposing the side surfaces of a corresponding one of the raceway grooves; a plurality of rolling elements provided between the side surfaces of the corresponding one of the raceway grooves and the power transmission surfaces so as to roll along the side surfaces of the corresponding one of the raceway grooves; and a cage that supports the rolling elements such that the rolling elements circulate on an outer periphery of the intermediate member, wherein the cage includes: a first circulating path which is located between one of the power transmission surfaces and one of the side surfaces of the corresponding one of the raceway grooves and which supports the rolling elements; a second circulating path which is located between the other of the power transmission surfaces and the other of the side surfaces of the corresponding one of the raceway grooves and which supports the rolling elements; a third circulating path which connects one ends of the first and second circulating paths located in an opening side of the outer ring; and a fourth circulating path which connects the other ends of the first and second circulating paths located in an interior side of the outer ring, wherein the first, second, third and fourth circulating paths have opening parts over an entire length in an outer peripheral side of the cage, and wherein widths of the opening parts of the third and fourth circulating paths are narrower than widths of the opening parts of the first and second circulating paths.

According to the present invention, the width of the opening parts in the third and fourth circulating paths is suitably set to be narrower than the width of the opening parts of the first and second circulating paths. Thus, the circulation of the rolling elements is not blocked and the rolling elements can be prevented from falling from the cage.

According to a fourteenth aspect of the present invention, in the sliding type tripod constant velocity joint of the thirteenth aspect, the third circulating path and the fourth circulating path are formed to be symmetrical with respect to the corresponding one of the tripod shaft parts.

Thus, since the form obtained by narrowing the width of the opening parts of the third and fourth circulating paths is a symmetrical form with respect to the tripod shaft parts, there is no difference as members between the first and second circulating paths, and third and fourth circulating paths. Accordingly, during the attachment of the constant velocity joint, an erroneous attachment such as an attachment opposite to an initial design can be eliminated.

A sliding type tripod constant velocity joint according to a fifteenth aspect of the present invention includes: an outer ring of a tubular form having three raceway grooves which are formed on an inner peripheral surface and which extend in a direction of a rotation axis of the outer ring; a tripod including a boss part connected to a shaft and three tripod shaft parts which are provided upright so as to extend outward in a radial direction of the boss part from an outer peripheral surface of the boss part and which are inserted into the raceway grooves, respectively; an intermediate member which is provided on an outer periphery of a corresponding one of the tripod shaft parts so as to be oscillated relative to the corresponding one of the tripod shaft parts and which has power transmission surfaces on outer surfaces and opposing the side surfaces of a corresponding one of the raceway grooves; a plurality of rolling elements provided between the side surfaces of the corresponding one of the raceway grooves and the power transmission surfaces so as to roll along the side surfaces of the corresponding one of the raceway grooves; and a cage that supports the rolling elements such that the rolling elements circulate on an outer periphery of the intermediate member, wherein under a state where a rotation axis of the outer ring coincides with a rotation axis of the shaft, a central axis of the corresponding one of the tripod shaft parts is closer to an opening side of the outer ring than to a central part of a width of the power transmission surfaces in the direction of the rotation axis of the outer ring.

According to the present invention, since the central axis of the tripod shaft parts is set nearer to the opening side of the outer ring than to the central part of the width of the power transmission surfaces in the intermediate member in the direction of the rotation axis of the outer ring, it may be said that the central axis of the tripod shaft parts is set nearer to the opening side of the outer ring than to the central part of an entire length in the roller unit. Thus, under a position where when the joint angle is applied to transmit the power, the cage located outside the roller unit comes closest to the shaft, a distance between both the members is increased more than that in a usual device. Accordingly, the maximum joint angle can be increased. Further, in such a structure, since the position of the roller unit is not changed outward in the radial direction of the outer ring, the maximum joint angle can be increased without enlarging the diameter of the outer ring. Accordingly, an entire part of the constant velocity joint is not enlarged and the above-described effects can be achieved.

Here, the "roller unit" includes members that transmit the power from the tripod shaft parts to the raceway grooves. For instance, a roller unit in a double roller type tripod constant velocity joint includes an inner roller, an outer roller, a roller support member and a snap ring. The roller unit in the tripod constant velocity joint of the present invention includes the intermediate member, the rolling elements and the cage.

According to a sixteenth aspect of the present invention, in the sliding type tripod constant velocity joint of the fifteenth aspect, under the state where the rotation axis of the outer ring coincides with the rotation axis of the shaft, the central axis of the corresponding one of the tripod shaft parts may be closer to the opening side of the outer ring than to a central part of a width of the cage in the direction of the rotation axis of the outer ring.

Thus, under a position where when the joint angle is applied to transmit the power, the cage located outside the roller unit comes closest to the shaft, a distance both the members is increased more than that in a usual device. Accordingly, the maximum joint angle can be more assuredly increased.

According to a seventeenth aspect of the present invention, in the sliding type tripod constant velocity joint of the fifteenth or sixteenth aspect, under the state where the rotation axis of the outer ring coincides with the rotation axis of the shaft, the central axis of the corresponding one of the tripod shaft parts may be closer to the opening side of the outer ring than to a central part of a width of the power transmission surfaces of the intermediate member in the direction of the rotation axis of the outer ring.

Thus, since the central axis of the tripod shaft parts is set nearer to the opening side of the outer ring relative to the central part of an entire part of the intermediate member, the maximum joint angle can be more assuredly increased.

According to an eighteenth aspect of the present invention, in the sliding type tripod constant velocity joint of any one of the fifteenth to the seventeenth aspects, the cage is formed to be symmetrical with respect to the direction of the rotation axis of the outer ring. Thus, when the cage is seen with the direction of the rotation axis of the outer ring set as a transverse direction, the cage is symmetrically formed from a central part. Thus, even when the maximum joint angle is to be increased by changing the design of the intermediate member in the above-described means, since the cage is symmetrically formed, during the attachment of the roller unit, the erroneous attachment such as the attachment opposite to an initial design can be prevented.

A sliding type tripod constant velocity joint according to a nineteenth aspect of the present invention includes: an outer ring of a tubular form having three raceway grooves which are formed on an inner peripheral surface and which extend in a direction of a rotation axis of the outer ring; a tripod including a boss part connected to a shaft and three tripod shaft parts which are provided upright so as to extend outward in a radial direction of the boss part from an outer peripheral surface of the boss part and which are inserted into the raceway grooves, respectively; an intermediate member which is provided on an outer periphery of a corresponding one of the tripod shaft parts so as to be oscillated relative to the corresponding one of the tripod shaft parts and which has power transmission surfaces on both side surfaces and opposing the side surfaces of a corresponding one of the raceway grooves; a plurality of rolling elements provided between the side surfaces of the corresponding one of the raceway grooves and the power transmission surfaces so as to roll along the side surfaces of the corresponding one of the raceway grooves; and a cage that supports the rolling elements such that the rolling elements circulate on an outer periphery of the intermediate member, wherein under a state where a rotation axis of the outer ring coincides with a rotation axis of the shaft, a central axis of the corresponding one of the tripod shaft parts is closer to an opening side of the outer ring than to a central part of a width of the cage in the direction of the rotation axis of the outer ring.

According to the present invention, since the central axis of the tripod shaft parts is set nearer to the opening side of the outer ring than to the central part of the width of the cage in the direction of the rotation axis of the outer ring, it may be said that the central axis of the tripod shaft parts is set nearer to the opening side of the outer ring than to the central part of an entire length in the roller unit. Thus, under a position where when the joint angle is applied to transmit the power, the cage located outside the roller unit comes closest to the shaft, a distance between both the members is increased more than that in a usual device. Accordingly, the maximum joint angle can be increased. Further, in such a structure, since the position of the roller unit is not changed outward in the radial direction of the outer ring, the maximum joint angle can be increased without enlarging the diameter of the outer ring. Accordingly, an entire part of the constant velocity joint is not enlarged and the above-described effects can be achieved.

A sliding type tripod constant velocity joint according to a twentieth aspect of the present invention includes: an outer ring of a tubular form having three raceway grooves which are formed on an inner peripheral surface and which extend in a direction of a rotation axis of the outer ring; a tripod including a boss part connected to a shaft and three tripod shaft parts which are provided upright so as to extend outward in a radial direction of the boss part from an outer peripheral surface of the boss part and which are inserted into the raceway grooves, respectively; an intermediate member which is provided on an outer periphery of a corresponding one of the tripod shaft parts so as to be oscillated relative to the corresponding one of the tripod shaft parts and which has power transmission surfaces on both side surfaces and opposing the side surfaces of a corresponding one of the raceway grooves; a plurality of rolling elements provided between the side surfaces of the corresponding one of the raceway grooves and the power transmission surfaces so as to roll along the side surfaces of the corresponding one of the raceway grooves; and a cage that supports the rolling elements such that the rolling elements circulate on an outer periphery of the intermediate member, wherein under a state where a rotation axis of the outer ring coincides with a rotation axis of the shaft, a central axis of the corresponding one of the tripod shaft parts is closer to an opening side of the outer ring than to a central part of a width of the intermediate member in the direction of the rotation axis of the outer ring.

According to the present invention, since the central axis of the tripod shaft parts is set nearer to the opening side of the outer ring than to the central part of the width of the intermediate member in the direction of the rotation axis of the outer ring, it may be said that the central axis of the tripod shaft parts is set nearer to the opening side of the outer ring than to the central part of an entire length in the roller unit. Thus, under a position where when the joint angle is applied to transmit the power, the cage located outside the roller unit comes closest to the shaft, a distance between both the members is increased more than that in a usual device. Accordingly, the maximum joint angle can be increased. Further, in such a structure, since the position of the roller unit is not changed outward in the radial direction of the outer ring, the maximum joint angle can be increased without enlarging the diameter of the outer ring. Accordingly, an entire part of the constant velocity joint is not enlarged and the above-described effects can be achieved.

MODE FOR CARRYING OUT THE INVENTION

Figure 1:
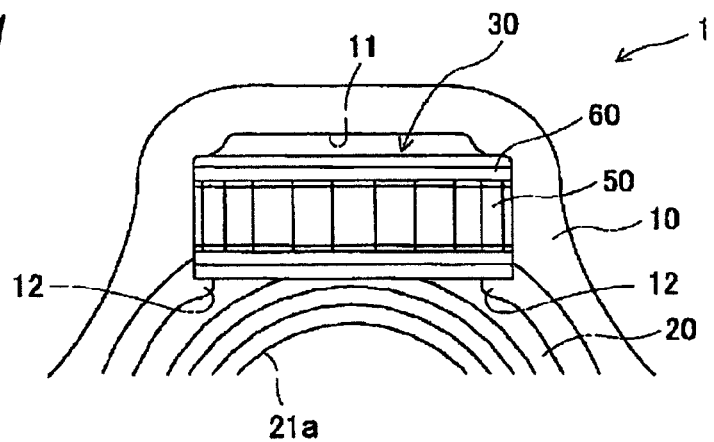
FIG. 1 shows a first exemplary embodiment: a diagram seen from an opening side of an outer ring 10 in an attached state of a part of a constant velocity joint 1.

Now, exemplary embodiments that embody a sliding type tripod constant velocity joint (refer it simply to as a "constant velocity joint", hereinafter) of the present invention will be described below by referring to the drawings. Here, as the constant velocity joint of the present exemplary embodiment, a case that the constant velocity joint is used for connecting a power transmission shaft of a vehicle will be described as an example. For instance, the case shows that the constant velocity joint is used in a connecting part of a shaft part connected to a differential gear and an intermediate shaft of a drive shaft.

<First Exemplary Embodiment>

Figure 2:
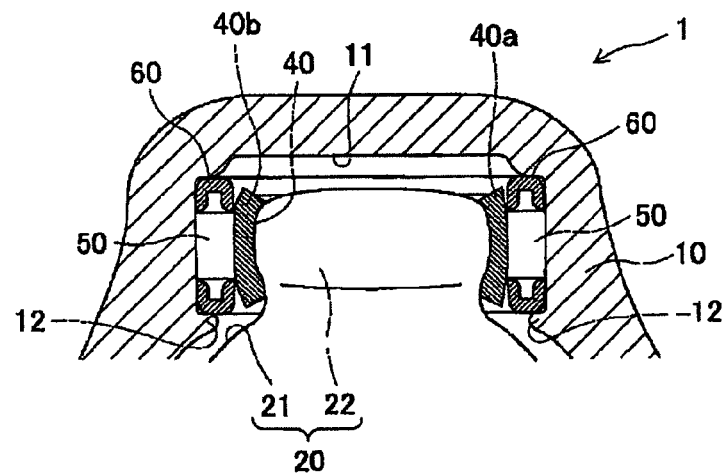
FIG. 2 is a radially sectional view of a part of the constant velocity joint 1.
Figure 3:
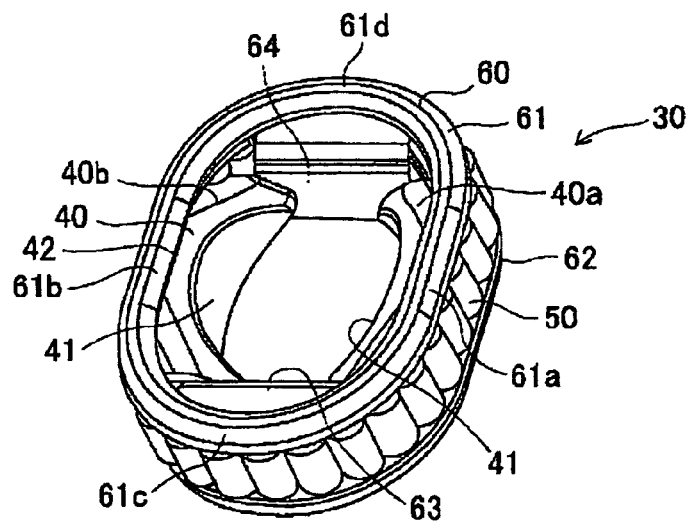
FIG. 3 is a perspective view of a roller unit 30.
Figure 4:
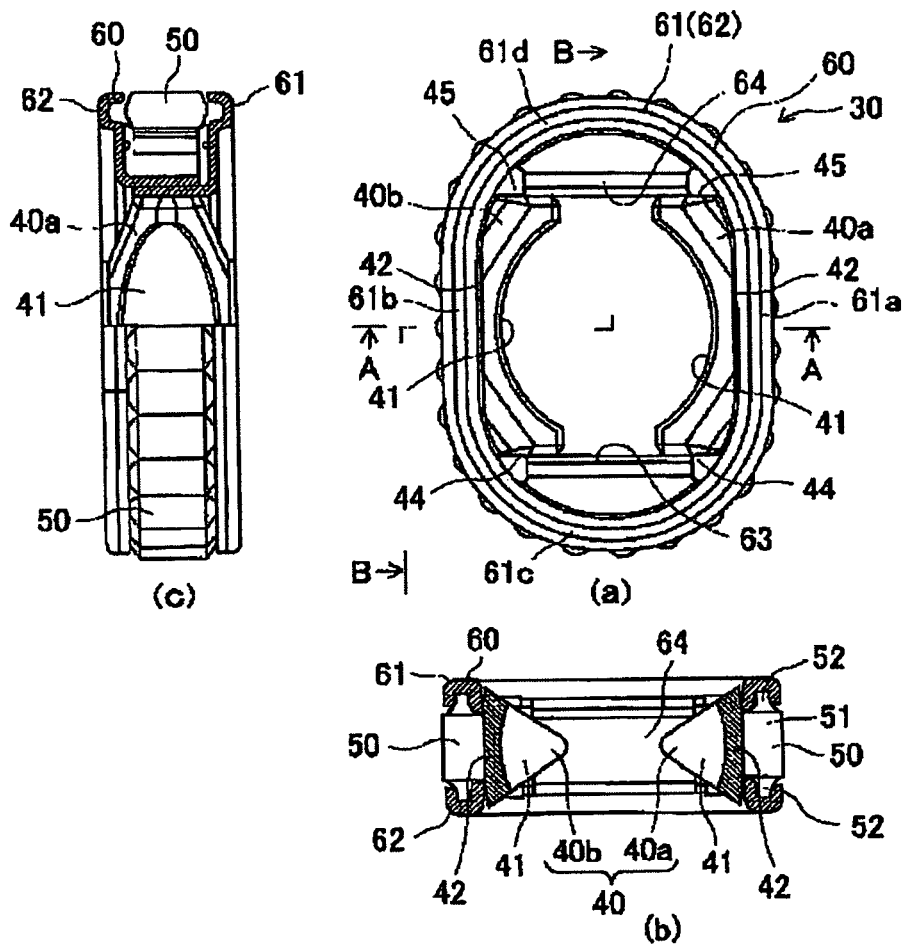
FIG. 4(a) is a plan view of the roller unit 30.
FIG. 4(b) is a sectional view of the roller unit 30 taken along a line A-A (a sectional view of a minor axis side) and FIG. 4(c) is a partly sectional view of the roller unit 30 taken along a line B-B (a diagram including a partial section of a major axis side).
Figure 5:
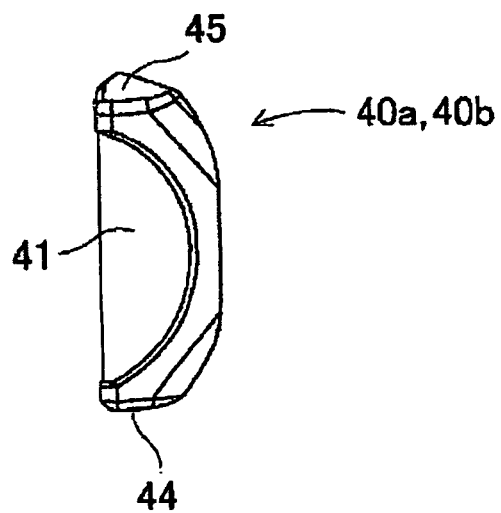
FIG. 5 is one perspective view of a pair of intermediate members 40.
Figure 6:
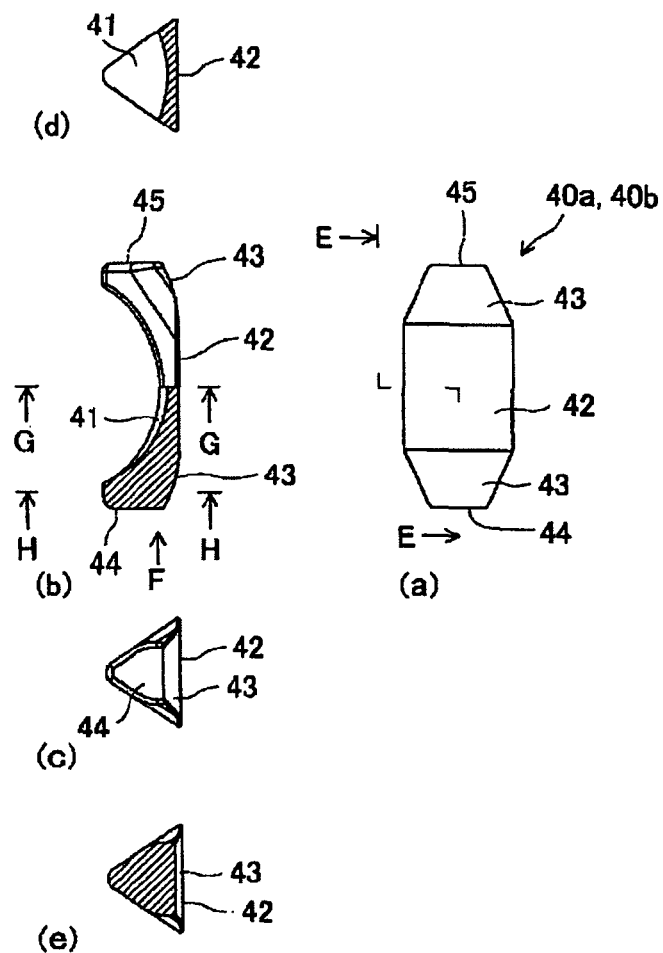
FIG. 6(a) is a front view of the intermediate member 40.
FIG. 6(b) is a partly sectional view of the intermediate member 40 taken along a line E-E.
FIG. 6(c) is a diagram seen from a direction F of the intermediate member 40.
FIG. 6(d) is a sectional view of the intermediate member 40 taken along a line G-G and FIG. 6(e) is a sectional view of the intermediate member 40 taken along a line H-H.
Figure 7:
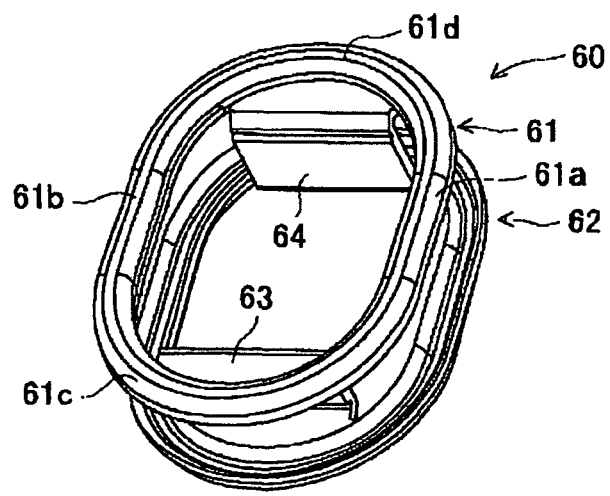
FIG. 7 is a perspective view of a cage 60.
Figure 8:
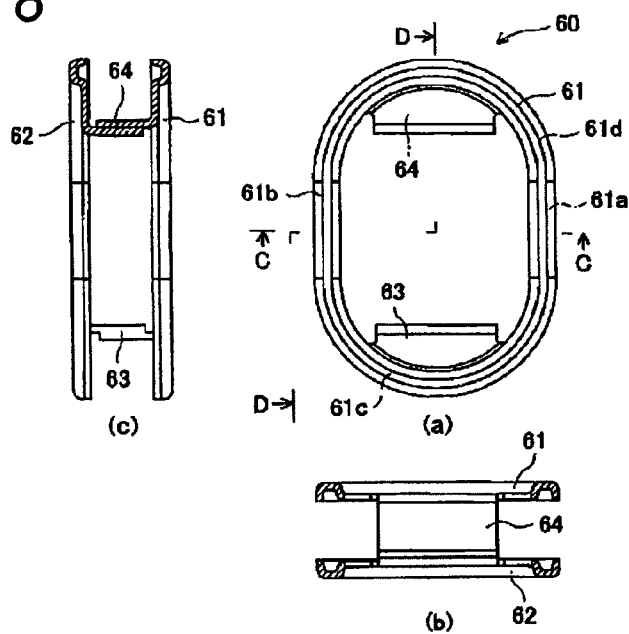
FIG. 8(a) is a plan view of the cage 60.
FIG. 8(b) is a sectional view of the cage 60 taken along a line C-C (a sectional view of a minor axis side) and FIG. 8(c) is a sectional view of the cage 60 taken along a line D-D (a diagram including a partial section of a major axis side).

A constant velocity joint 1 of a first exemplary embodiment will be described by referring to FIGS. 1 to 8. FIG. 1 is a diagram seen from an opening side of an outer ring 10 in an attached state of a part of the constant velocity joint 1. FIG. 2 is a radially sectional view of a part of the constant velocity joint 1. FIG. 3 is a perspective view of a roller unit 30. FIG. 4(a) is a plan view of the roller unit 30, FIG. 4(b) is a sectional view of the roller unit 30 taken along a line A-A (a sectional view of a short diameter side) and FIG. 4(c) is a partly sectional view of the roller unit 30 taken along a line B-B (a diagram including a partial section of a long diameter side). FIG. 5 is one perspective view of a pair of intermediate members 40. FIG. 6(*a*) is a front view of the intermediate member 40, FIG. 6(*b*) is a partly sectional view of the intermediate member 40 taken along a line E-E, FIG. 6(*c*) is a diagram seen from a direction F of the intermediate member 40, FIG. 6(*d*) is a sectional view of the intermediate member 40 taken along a line G-G and FIG. 6(*e*) is a sectional view of the intermediate member 40 taken along a line H-H. FIG. 7 is a perspective view of a cage 60. FIG. 8(*a*) is a plan view of the cage 60, FIG. 8(*b*) is a sectional view of the cage 60 taken along a line C-C (a sectional view of a short diameter side) and FIG. 8(*c*) is a sectional view of the cage 60 taken along a line D-D (a diagram including a partial section of a long diameter side).

As shown in FIGS. 1 and 2, the constant velocity joint 1 includes an outer ring 10, a tripod 20 and a roller unit 30.

The outer ring 10 is formed in a tubular shape (for instance, a tubular shape having a bottom) and has one end side connected to a differential gear (not shown in the drawing). Then, in an inner peripheral surface of the tubular part of the outer ring 10, three raceway grooves 11 that extend in the axial direction (a forward and backward direction in FIG. 1) of the outer ring are formed at equal intervals in the circumferential direction of an outer ring shaft. A sectional form orthogonal to an extending direction of a groove in each raceway groove 11 has a U shape. Namely, each raceway groove 11 includes a groove bottom surface substantially formed in a plane and side surfaces formed in planes orthogonal to the groove bottom surface and opposed in parallel with each other.

Further, in both opening edges of the raceway groove 11, engaging protrusions 12 are formed which narrow opening width of the raceway groove 11. The engaging protrusions 12 serve to regulate a position of a cage 60 forming a below-described roller unit 30. Namely, the cage 60 is constantly located in the raceway groove 11 by the engaging protrusions 12.

The tripod 20 is arranged inside the tubular part of the outer ring 10. The tripod 20 includes a boss part 21 and three tripod shaft parts 22. The boss part 21 has a tubular form and is provided with an inner peripheral spline 21*a* in an inner peripheral side. The inner peripheral spline 21*a* is fitted and connected to an outer peripheral spline of an intermediate shaft (not shown in the drawings). Further, an outer peripheral surface of the boss part 21 is formed substantially in a spherically protruding shape.

The tripod shaft parts 22 are respectively provided upright so as to extend radially outward the boss part 21 from the outer peripheral surface of the boss part 21. These tripod shaft parts 22 are formed at equal intervals (at intervals of 120 deg) in the circumferential direction of the boss part 21. At least end parts of the tripod shaft parts 22 are respectively inserted into the raceway grooves 11 of the outer ring 10. The outer peripheral surfaces of the tripod shaft parts 22 are respectively formed in spherically protruding shapes.

The roller unit 30 is formed in an annular shape as an entire shape as shown in FIGS. 3 and 4 and arranged in an outer peripheral side of the tripod shaft parts 22. Further, the roller unit 30 is fitted to the raceway grooves 11 so as to be movable in the direction in which the raceway grooves 11 extend. The roller unit 30 includes an intermediate member 40, a plurality of rolling elements 50 and a cage 60.

An outer form of the intermediate member 40 is configured substantially in a rectangular shape as an entire form. Further, when the intermediate member 40 is observed as a whole, a part corresponding to a circular hole is formed in a center of the intermediate member 40. The intermediate member 40 includes a pair of members 40*a* and 40*b*. The one pair of intermediate members 40*a* and 40*b* are formed by separate members so as to have symmetrical forms relative to a plane passing thorough a central axis (it is also referred to as a "tripod axis") of the tripod shaft part 22 and a rotation axis of an intermediate shaft and respectively independent. The one pair of intermediate members 40*a* and 40*b* are arranged, as shown in FIG. 2, so as to sandwich the tripod shaft part 22 from both sides of side surfaces of the raceway grooves 11. Namely, both the intermediate members 40*a* and 40*b* are arranged so as to sandwich the tripod shaft part 22 from both sides in a power transmitting direction (a direction on the rotation axis of the outer ring or on the rotation axis of the intermediate shaft). The one pair of intermediate members 40*a* and 40*b* are provided so as to oscillate in the direction of the rotation axis of the outer ring 10 relative to the tripod shaft part 22 and oscillate in the circumferential direction of the outer ring 10.

A detailed form of each of the intermediate members 40*a* and 40*b* will be described by referring to FIG. 5 and FIGS. 6(*a*) to 6(*d*). The surface of each of the intermediate members 40*a* and 40*b* includes a tripod contact surface 41, a power transmission surface 42, intermediate member introducing surfaces 43 and axial end faces 44 and 45. Here, when the one pair of intermediate members 40*a* and 40*b* are seen as one body, the tripod contact surfaces 41 form an inner surface and the power transmission surfaces 42, the intermediate member introducing surfaces 43 and the axial end faces 44 and 45 form an outer surface.

The tripod contact surface 41 is formed in a partly spherically recessed shape to come into contact with the tripod shaft part 22 so as to oscillate in the axial direction of the outer ring 10 and in the circumferential direction of the outer ring 10. A center of a spherical surface of the tripod contact surface 41 is located on a straight line passing thorough a center of a transverse width (the thickness of the intermediate member 40) of the tripod contact surface 41 shown in FIG. 6(*a*) and a center of a vertical width (a width of the intermediate member 40 in the axial direction of the outer ring 10) shown in FIG. 6(*b*).

The power transmission surface 42 and the intermediate member introducing surfaces 43 are provided in a back surface side of the tripod contact surface 41, that is, in the right side in FIG. 6(*b*). The power transmission surface 42 is formed in a planar and rectangular shape. The intermediate members 40*a* and 40*b* are respectively arranged so that the power transmission surface 42 is parallel to the side surfaces of the raceway groove 11. Namely, under a position that the rotation axis of the outer ring 10 coincides with the rotation axis of the intermediate shaft (a joint angle of 0 deg), the power transmission surface 42 is parallel to the plane passing thorough the central axis of the tripod shaft part 22 and the rotation axis of the intermediate shaft. Further, the power transmission surface 42 is located at a central part in the vertical direction shown in FIG. 6(*b*) and has a width about ⅔ times as long as the vertical width shown in FIG. 6(*b*). Namely, in the back surface side of the deepest part of the tripod contact surface 41, the power transmission surface 42 is located. The power transmission surface 42 includes a range where the power transmission surface may come into contact with the plurality of rolling elements 50.

The intermediate member introducing surfaces 43 are formed at both sides adjacent to the power transmission surface 42. The intermediate member introducing surfaces 43 are formed with slightly bent curved surfaces and smoothly formed relative to the power transmission surface 42 (continuously without stepped parts). The intermediate member introducing surfaces 43 protrude outward and are bent toward sides which do not protrude from the plane of the power transmission surface 42. Namely, the intermediate member introducing surfaces 43 are bent more toward sides separating from the side surfaces of the raceway groove 11, as the intermediate member introducing surfaces come nearer to the axial end faces 44 and 45 sides from the power transmission surface 42 side. Further, the intermediate member introducing surfaces 43 are formed substantially in trapezoidal shapes in such a way that as the intermediate member introducing surfaces 43 come nearer to the axial end faces 44 and 45 sides from the power transmission surface 42 side, the transverse width of FIG. 6(a) is the more reduced. The intermediate member introducing surfaces 43 come into contact with and guide the rolling elements 50 which are circulated on the outer periphery of the intermediate member 40 so as to smoothly enter the power transmission surface 42 and smoothly discharge the rolling elements 50 from the power transmission surface 42.

The axial end faces 44 and 45 are parts located at both ends in upper and lower parts in FIG. 6(b). Both the axial end faces 44 and 45 are formed with planes orthogonal to the power transmission surface 42. Namely, the axial end faces 44 and 45 are formed with planes orthogonal to the side surfaces of the raceway groove 11. Here, horizontally sectional forms of FIGS. 6(a) and 6(b) in the intermediate members 40 respectively show regular triangular shapes as shown in FIGS. 6(c) and 6(e). The axial end faces 44 and 45 also have regular triangular shapes as shown in FIG. 6(d).

The rolling element 50 is a needle as shown in FIGS. 2 and 4. The rolling element 50 includes a cylindrical part 51 and small diameter shaft parts 52 having a circular section cut in the direction (a transverse direction in FIG. 2) orthogonal to an extending direction of the pillar and provided at both ends in the extending direction of the pillar. As shown in FIG. 4(b), the small diameter shaft part 52 may have a form whose diameter is smaller as the small diameter shaft part 52 comes nearer to the end part or a stepped form (not shown in the drawings). The plurality of rolling elements 50 are provided so as to circulate on an outer periphery when the one pair of intermediate members 40a and 40b are seen as one body. A part of the plurality of rolling elements 50 is provided between the side surface of the raceway groove 11 and the power transmission surfaces 42 of the one pair of intermediate members 40a and 40b so as to roll along the side surface of the raceway groove 11 and the power transmission surfaces 42. That is, a power is transmitted between the power transmission surfaces 42 and the side surface of the raceway groove 11 through the rolling elements 50.

As shown in FIGS. 7 and 8(a), the cage 60 has an annular shape as an entire form. The cage 60 includes a pair of circulating path forming members 61 and 62 that form a circulating path of the rolling elements 50 and a pair of connecting parts 63 and 64. The one pair of circulating path forming members 61 and 62 are located in peripheral edges of the cage 60 and have elliptic forms. The one pair of circulating path forming members 61 and 62 have such forms as to surround the one pair of intermediate members 40a and 40b.

Specifically, the circulating path forming member 61 includes opposed straight line parts 61a and 61b and semi-circular arc shaped bent parts 61c and 61d for connecting the straight line parts 61a and 61b. Further, another circulating path forming member 62 includes straight line parts and bent parts similarly to the above-described circulating path forming member 61.

Further, one pair of circulating path forming members 61 and 62 are respectively configured in U shaped sectional forms into which the small diameter shaft parts 52 of the rolling element 50 can be inserted and with which the cylindrical part 51 is engaged. Namely, a width (a distance between an inner peripheral edge and an outer peripheral edge) of the one pair of circulating path forming members 61 and 62 is formed to be smaller than a maximum diameter of the cylindrical part 51 of the rolling element 50. Under a state that the U shaped opening sides of the circulating path forming members 61 and 62 are spaced by a distance longer than the axial length of the cylindrical part 51 of the rolling element 50, the U shaped opening sides are provided so as to be opposed to each other. A maximum width between the one pair of circulating path forming members 61 and 62 in an opposing direction is set to be slightly smaller than the width of the side surface of the raceway groove 11. Namely, the cage 60 is provided so that an inclination thereof is regulated relative to the raceway groove 11 by the groove bottom surface and the engaging protrusions 12 of the raceway groove 11 and the cage may be inserted into the raceway groove 11.

The one pair of connecting parts 63 and 64 respectively connect together central parts (upper and lower end parts in FIG. 8(a)) in the circumferential direction of the bent parts 61c and 61d of the one pair of circulating path forming members 61 and 62. Namely, as shown in FIG. 8(c), a part between the one pair of circulating path forming members 61 and 62 is opened in a part excluding the connecting parts 63 and 64.

The connecting parts 63 and 64 are configured in U shaped forms opened outward the cage 60. Bottom surfaces opposite to opening sides of the U shaped forms of the connecting parts 63 and 64 (an inner side of the cage 60) are formed to be flat. The bottom surfaces opposite to the opening sides of the U shaped forms of the one pair of connecting parts 63 and 64 are provided so as to be parallel and opposed to each other. A clearance between the bottom surfaces opposite to the opening sides of the U shaped forms of the one pair of connecting parts 63 and 64 substantially corresponds to a distance between the axial end faces 44 and 45 of the intermediate members 40a and 40b respectively. Bottom surfaces and opening sides (an outer side of the cage 60) of the U shaped forms of the connecting parts 63 and 64 are formed to be flat in parallel with the bottom surfaces opposite to the opening sides.

Further, one of end parts of the opening sides of the U shaped forms of the connecting parts 63 and 64 are respectively connected to the central parts in the circumferential direction of the bent parts 61c and 61d of the circulating path forming member 61 and the other of the end parts are respectively connected to the central parts in the circumferential direction of the bent parts of the circulating path forming member 62.

Then, into the U shaped forms of the one pair of circulating path forming members 61 and 62, the small diameter shaft parts 52 of the rolling element 50 are inserted. In such a way, the rolling element 50 is supported by the one pair of circulating path forming members 61 and 62. Namely, the one pair of circulating path forming members 61 and 62 support the rolling elements 50 so that the plurality of rolling elements 50 may circulate on the outer peripheries of the one pair of intermediate members 40a and 40b. Here, the U shaped forms of the one pair of circulating path forming members 61 and 62 have small clearances relative to the outer peripheral surfaces of the small diameter shaft parts 52 of the rolling element 50. Further, under a state that the small diameter shaft parts 52 of the rolling element 50 are inserted into the circulating path forming members 61 and 62, the cylindrical part 51 of the rolling element 50 protrudes inside from the inner peripheral edges of the circulating path forming members 61 and 62 and protrudes outside from the outer peripheral edges of the circulating path forming members 61 and 62.

Here, under a state that the one pair of intermediate members 40a and 40b are arranged in the outer peripheral sides of the tripod shaft part 22 and the one pair of intermediate members 40a and 40b are arranged inside the cage 60, the straight line parts 61a and 61b (right and left straight line parts in FIG. 8(*a*)) (corresponding to a "first circulating path" of the present invention) are arranged between the power transmission surfaces 42 of the intermediate members 40a and 40b and the side surfaces of the raceway groove 11 so as to be substantially parallel to both the surfaces (in a following state). Namely, the circulating path formed by the straight line parts 61a and 61b forms a circulating path when the rolling element 50 moves on the power transmission surfaces 42. In at least one between the straight line parts 61a and 61b, the power transmission surfaces 42 and the side surfaces of the raceway grooves 11, a clearance is formed.

Further, both end parts of the bent parts 61c and 61d (corresponding to a "second circulating path" of the present invention) of the one pair of circulating path forming members 61 and 62 are arranged so as to be defined along the intermediate member introducing surfaces 43 of the intermediate members 40a and 40b. Namely, the circulating path formed by both the end parts of the bent parts 61c and 61d forms a circulating path when the rolling element 50 rolls on the intermediate member introducing surfaces 43. The circulating path is connected to the circulating path formed by the straight line parts 61a and 61b so as to be smoothly continuous to the circulating path formed by the straight line part 61a and 61b. Further, clearances are formed between both the end parts of the bent parts 61c and 61d forming the circulating path and the intermediate member introducing surfaces 43. It is to be understood that clearances are formed between both the end parts of the bent parts 61c and 61d and the side surfaces of the raceway groove 11.

As described above, the power transmission surfaces 42 and the intermediate member introducing surfaces 43 of the one pair of intermediate members 40a and 40b which form one side of the power transmitting direction are configured so as to form clearances relative to the circulating path forming members 61 and 62 of the cage 60. Namely, the one pair of intermediate members 40a and 40b are not regulated in the power transmitting direction relative to the one pair of circulating path forming members 61 and 62.

Further, a circulating path (corresponding to a "third circulating path" of the present invention) of the bent parts 61c and 61d of the one pair of circulating path forming members 61 and 62 which is connected to the parts defined along the intermediate member introducing surfaces 43 is smoothly and continuously connected to the circulating path defined along the intermediate member introducing surfaces 43.

Then, in accordance with the relation between the forms and the clearance of the axial end faces 44 and 45 of the intermediate members 40a and 40b respectively and the forms and the clearance of the bottom surfaces opposite to the opening sides of the U shaped forms of the connecting parts 63 and 64, the intermediate members 40a and 40b are provided between the connecting parts 63 and 64 so that the connecting parts 63 and 6 regulate a relative operation of the intermediate members 40a and 40b in the axial direction (a vertical direction in FIG. 8(*a*)) of the outer ring 10. However, since the intermediate members 40a and 40b are not regulated in a radial direction (a vertical direction in FIG. 8(*b*)) of the outer ring 10 relative to the cage 60, the intermediate members 40a and 40b can move in the radial direction (the vertical direction in FIG. 8(*b*)). Namely, the cage 60 does not come into contact with the one pair of intermediate members 40 and the side surfaces of the raceway groove 11 in the power transmitting direction.

Now, an operation of the above-described constant velocity joint 1 will be described below. When the outer ring 10 having the one end side connected to the differential gear receives a power to rotate, the tripod shaft parts 22 respectively transmit the power through the roller units 30 respectively fitted to the raceway grooves 11 and the intermediate shaft connected to the tripod 20 rotates at constant velocity. At this time, when the joint angle is not 0 deg, the tripod 20 rotates on the intermediate shaft under a state that the tripod 20 is inclined by the joint angle relative to a section orthogonal to the rotation axis of the outer ring 10. Accordingly, when viewing from the side surfaces of the raceway grooves 11, the tripod shaft parts 22 are reciprocated in the extending direction of the raceway grooves 11 in accordance with the rotation of the outer ring 10 and the tripod 20 and oscillated relative to the raceway grooves 11.

Further, as described above, since the tripod 20 is inclined by the joint angle relative to the section orthogonal to the rotation axis of the outer ring 10, an angle formed by the tripod shaft parts 22 seen from the direction of the rotation axis of the outer ring 10 changes depending on a phase of the intermediate shaft. Accordingly, in order to insert the three tripod shaft parts 22 respectively into the raceway grooves 11, the rotation axis of the shaft connected to the tripod 20 is eccentrically rotated relatively to the rotation axis of the outer ring 10. Accordingly, the end parts of the tripod shaft parts 22 are reciprocated in the radial direction of the outer ring 10 in accordance with the rotation of the outer ring 10 and the tripod 20.

Here, the tripod contact surfaces 41 of the one pair of intermediate members 40a and 40b forming the roller unit 30 are fitted to the tripod shaft parts 22 so as to oscillate. Further, the one pair of intermediate members 40a and 40b are regulated in the axial direction of the outer ring 10 by the cage 60 forming the roller unit 30. Further, the cage 60 is fitted to the raceway grooves 11. Accordingly, the cage 60 is movable in the extending direction of the raceway grooves 11 relative to the raceway grooves 11, however, an inclination to the raceway grooves 11 is substantially fixed. Then, the rolling elements 50 circulate on the outer peripheries of the one pair of intermediate members 40a and 40b.

Accordingly, the rolling elements 50 roll between the power transmission surfaces 42 as members of a power transmission side of the intermediate members 40a and 40b and the side surfaces of the raceway grooves 11 without generating a slide in the extending direction of the raceway grooves 11 relative to the raceway grooves 11 and the power transmission surface 42. Thus, the generation of an induced thrust force can be prevented.

Further, the member of the one pair of intermediate members 40a and 40b which receives the power through the plurality of rolling elements 50 transmits the power to the tripod shaft parts 22 on which the tripod contact surface 41 abuts. At this time, when the joint angle is applied as described above, the tripod shaft parts 22 are reciprocated in the radial direction of the outer ring 10. Accordingly, since the intermediate member 40a spherically fitted to the tripod shaft parts 22 follows the tripod shaft parts 22, the intermediate member slides in the radial direction of the outer ring 10 relative to the rolling elements 50. Thus, a load point in the power transmission surface 42 to which the power is most applied is reciprocated in the axial direction of the rolling elements 50. In accordance with the movement of the load point, an oscillating force is applied to the member of the power transmission side of the one pair of intermediate members 40a and 40b as the member of the power transmission side on a point where the rolling elements 50 abut on the side surfaces of the raceway grooves 11 as a supporting point.

However, the one pair of intermediate members 40a and 40b are independent respectively in the power transmission side and a back surface side thereof. Thus, even when a load position is changed by the tripod shaft parts, which arises in the power transmission side, an operation of the member of the power transmission side of the one pair of intermediate members 40a and 40b does not give an influence to an operation of the intermediate member of the back surface side. Accordingly, the back surface side of the roller unit 30 can be prevented from applying a large force to the raceway grooves 11, so that the generation of the induced thrust force can be extremely reduced. Further, a clearance between the intermediate member 40a (or 40b) of the back surface side and the raceway grooves 11 does not need to be enlarged to prevent the generation of a rotation backlash.

Especially, the cage 60 is not regulated in the power transmitting direction relative to the one pair of intermediate members 40. Thus, the cage 60 can prevent the rolling elements 50 from acting so as to apply a force to the raceway grooves 11 of the outer ring 10 in the back surface side of a power transmission. Accordingly, the above-described matter can reduce the occurrence of the induced thrust force in the back surface side of the power transmission.

Further, in the one pair of intermediate members 40a and 40b, the intermediate member introducing surfaces 43 which are smoothly continuous to the power transmission surfaces 42 are formed to smoothly guide the circulating rolling elements 50 to the power transmission surfaces 42 so as to come into contact therewith. In such a way, since the power transmission surfaces 42 of the power transmission members 40a and 40b and the intermediate member introducing surfaces 43 which allow the rolling elements 50 to enter the power transmission surfaces 42 are formed with the same members, positions of the rolling elements 50 entering the power transmission surfaces 42 can be stably arranged.

Further, the circulating paths formed by both the end parts of the bent parts 61c and 61d of the one pair of circulating path forming members 61 and 62 are formed with configurations defined along the intermediate member introducing surfaces 43. The circulating paths (the circulating paths connected to the connecting parts 63 and 64) of the circulating paths defined along the intermediate member introducing surfaces 43 which are connected to opposite sides to the power transmission surfaces 42 are smoothly and continuously connected to the circulating paths defined along the intermediate member introducing surfaces 43.

Here, since the intermediate member introducing surfaces 43 are not parts that transmit the power between the raceway grooves 11 and the intermediate member introducing surfaces, a greatly large load is not applied to the rolling elements 50 moving on the intermediate member introducing surfaces 43. Therefore, the rolling elements 50 can be allowed to stably enter the circulating paths defined along the intermediate member introducing surfaces 43 from the circulating paths to which the connecting parts 63 and 64 are connected. As a result, the rolling elements 50 can be smoothly moved from the circulating paths to which the connecting parts 63 and 64 are connected to the circulating paths defined along the intermediate member introducing surfaces 43, and from the circulating paths defined along the intermediate member introducing surfaces 43 to the circulating paths defined along the power transmission surfaces 42.

Further, since the one pair of intermediate members 40a and 40b are spherically fitted to the tripod shaft parts 22 so as to be oscillated, a load (face pressure) per unit area of the intermediate members 40a and 40b can be reduced to improve the durability of the intermediate members 40a and 40b. Further, since the intermediate members 40a and 40b follow the sliding tripod shaft parts 22, the positions thereof can be determined relative to the tripod shaft parts 22 to stably transmit the power. Further, since the one pair of intermediate members 40a and 40b are arranged so as to sandwich the tripod shaft parts 22 between them, the tripod contact surfaces 41 of the intermediate members 40a and 40b are respectively easily formed in entirely spherically recessed shapes. Accordingly, power transmission areas of the tripod shaft parts 22 and the one pair of intermediate members 40a and 40 can be increased. Further, when the tripod shaft parts 22 come into angular contact with the intermediate members 40a and 40b, two points of the angular contact are further spaced to be stabilized.

Since the rolling elements 50 have cylindrical needle shapes, the needles abut on the side surfaces of the raceway grooves 11 of the outer ring 10 in the axial direction of the cylinder to transmit the power. Thus, the roller unit 30 is low in its rotation backlash as a whole, so that a stable power transmission can be realized.

<Modification of First Exemplary Embodiment>

In the above-described first exemplary embodiment, the tripod contact surfaces 41 of the one pair of intermediate members 40a and 40b have the spherically recessed shapes. Otherwise, the tripod contact surfaces 41 of the one pair of intermediate members 40a and 40b may be formed in cylindrical surfaces.

In this case, other structures are the same as those of the first exemplary embodiment. Namely, the one pair of intermediate members 40a and 40b are formed so that the tripod contact surfaces 41 thereof have the cylindrical surfaces and arranged so as to sandwich tripod shaft parts 22 between them. Thus, the tripod shaft parts 22 and the one pair of intermediate members 40 can slide.

In such a structure, the tripod shaft parts 22 may have a range in which the tripod shaft parts 22 can slide enlarged relative to a roller unit 30. Even when a joint angle is applied to increase an amount that the tripod shaft parts 22 slide, the above-described effects can be held and a power can be transmitted. Further, in accordance with the above-described structure, a structure may be used that can suppress a slide between rolling elements 50 and the intermediate members 40a and 40b.

<Second Exemplary Embodiment>

Figure 9:
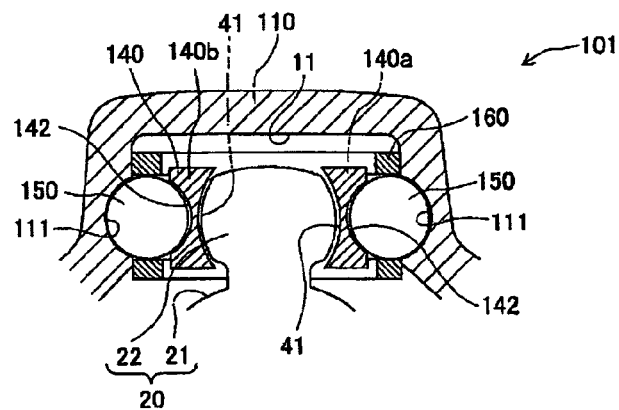
FIG. 9 shows a second exemplary embodiment: a radially sectional view of a part of a constant velocity joint 101.
Figure 10:
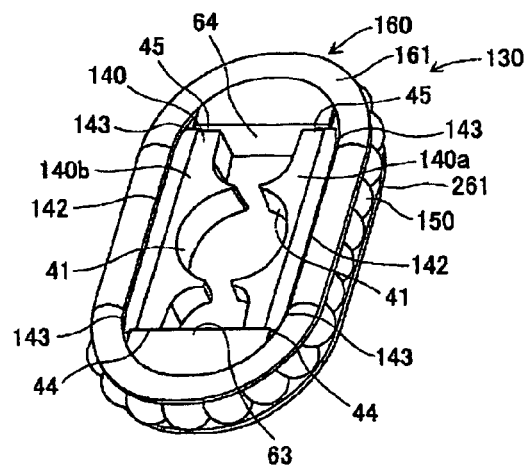
FIG. 10 is a perspective view of a roller unit 130.
Figure 11:
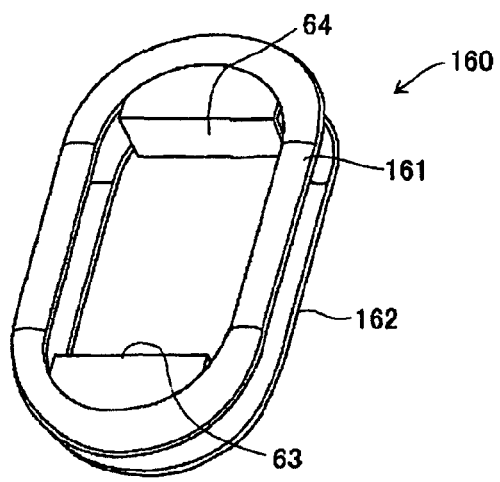
FIG. 11 is a perspective view of a cage 160.
Figure 12:
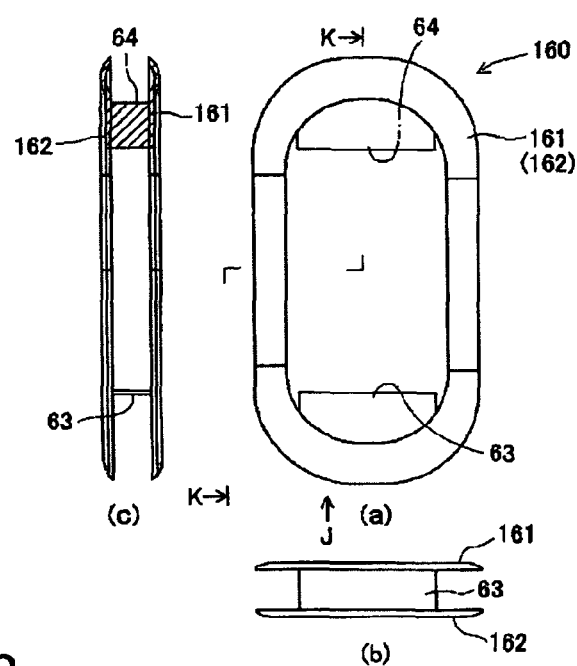
FIG. 12(a) is a plan view of the cage 160.
FIG. 12(b) is a view of the cage 160 seen from a direction J and FIG. 12(c) is a sectional view of the cage 160 taken along a line K-K (a diagram including a partial section of a major axis side).
Figure 13:
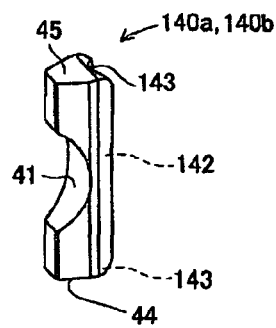
FIG. 13 is one perspective view of a pair of intermediate members 140.
Figure 14:
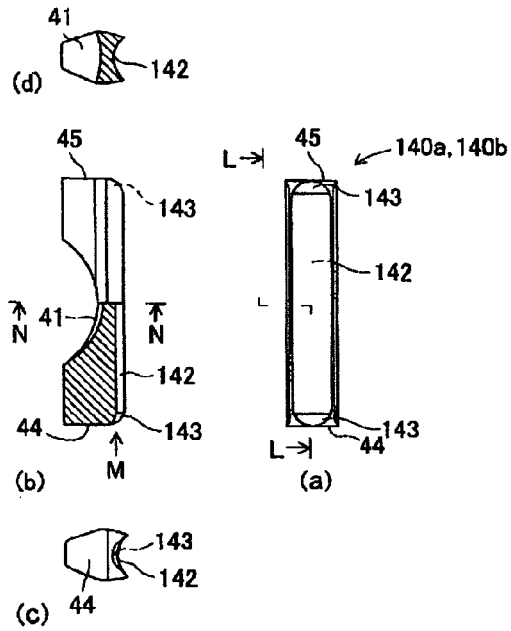
FIG. 14(a) is a front view of the intermediate member 140.
FIG. 14(b) is a partly sectional view of the intermediate member 140 taken along a line L-L.
FIG. 14(c) is a diagram seen from a direction M of the intermediate member 140 and FIG. 14(d) is a sectional view of the intermediate member 140 taken along a line N-N.

Now, a constant velocity joint 101 of a second exemplary embodiment will be described by referring to FIG. 9 to FIG. 14. FIG. 9 is a radially sectional view of a part of the constant velocity joint 101 of the second exemplary embodiment. FIG. 10 is a perspective view of a roller unit 130. FIG. 11 is a perspective view of a cage 160. FIG. 12(a) is a plan view of the cage 160, FIG. 12(b) is a view of the cage 160 seen from a direction J and FIG. 12(c) is a sectional view of the cage 160 taken along a line K-K (a diagram including a partial section of a major axis side). FIG. 13 is one perspective view of a pair of intermediate members 140. FIG. 14(a) is a front view of the intermediate member 140, FIG. 14(b) is a partly sectional view of the intermediate member 140 taken along a line L-L, FIG. 14(c) is a diagram of the intermediate member 140 seen from a direction M and FIG. 14(d) is a sectional view of the intermediate member 140 taken along a line N-N.

As shown in FIG. 9 and FIG. 10, the constant velocity joint 101 includes an outer ring 110, a tripod 20 and a roller unit 130. Here, the constant velocity joint 101 of the second exemplary embodiment is, mainly different in view of a point that the rolling element 50 of the constant velocity joint 1 of the first exemplary embodiment is changed from the needle to a spherical member. In accordance therewith, the forms of side surfaces of raceway grooves 111 of an outer ring 110 and configurations of outer surfaces of one pair of intermediate members 140 are different from those of the constant velocity joint 1 of the first exemplary embodiment. Since the tripod 20 is the same as the tripod 20 of the first exemplary embodiment, a detailed explanation thereof will be omitted. Only different points will be described below.

The outer ring 110 is different from the outer ring 10 of the first exemplary embodiment only in the forms of the side surfaces of the raceway grooves. As shown in FIG. 9, on the side surfaces at both sides of the raceway grooves 111, recessed grooves are formed so as to define the spherical surfaces of rolling elements 150 so that the rolling elements 150 formed with the spherical members may be positioned in the radial direction of the outer ring 110. Namely, in the recessed grooves in the side surfaces of the raceway grooves 111, a sectional form in the radial direction of the outer ring 110 is a circular arc form.

The roller unit 130 is formed in an annular shape as an entire shape as shown in FIG. 10 and arranged in an outer peripheral side of tripod shaft parts 22. The roller unit 130 includes an intermediate member 140, a plurality of rolling elements 150 and a cage 160.

The intermediate member 140 includes one pair of intermediate members 140a and 140b. As shown in FIG. 13 and FIG. 14, the surface of each of the one pair of intermediate members 140a and 140b includes a tripod contact surface 41, a power transmission surface 142, intermediate member introducing surfaces 143 and axial end faces 44 and 45. The tripod contact surface 41 and the axial end faces 44 and 45 are the same as those of the first exemplary embodiment.

On the power transmission surface 142, a recessed groove is formed so as to define the spherical surface of the rolling element 150 as the spherical member. Further, on the intermediate member introducing surfaces 143 formed at both sides adjacent to the power transmission surface 142, recessed grooves are formed which are similar to that of the power transmission surface 142. Other structures of the power transmission surface 142 and the intermediate member introducing surfaces 143 are the same as those of the first exemplary embodiment.

As shown in FIG. 10, the rolling element 150 is the spherical member and a plurality of rolling elements are arranged so as to circulate on an outer periphery of the intermediate member 140 as in the case of the needle.

The cage 60 has an annular shape as an entire form similarly to the case that the rolling element is the needle. While the circulating path forming members 61 and 62 that form the cage 60 of the first exemplary embodiment are respectively configured in U shaped forms, circulating path forming members 161 and 162 of the cage 160 of the second exemplary embodiment are arranged so as to be opposed in the vertical direction in FIG. 9 and provided with circular arc recessed grooves so as to support the spherical rolling elements 150.

Now, an operation of the above-described constant velocity joint 101 will be described below. Differently from the case that the rolling element 150 is the needle, when the spherical surfaces of the rolling elements 150 respectively abut on the circular arc recessed grooves of the intermediate members 140a and 140, both the members can oscillate when viewing from the axial direction of the outer ring 110. Accordingly, when a joint angle is taken, the intermediate members 140a and 140b oscillate relative to the tripod shaft parts 22 sliding in the axial direction of the tripod when viewing from the axial direction of the outer ring 110.

The constant velocity joint 101 of the second exemplary embodiment constructed as described above achieves the same effects as those by the constant velocity joint 1 of the first exemplary embodiment. Further, the rolling element 150 as the spherical member is high in its rigidity and excellent in its circulating property. Further, the spherical member having the small number of working processes is relatively easily produced and an attachment of the constant velocity joint 101 can be simplified. Further, since the rolling element 150 is formed with the spherical member, load points applied to members respectively are not biased depending on the varying positional relation between the tripod shaft parts 22 and the raceway grooves 111 and a power can be transmitted.

<Third Exemplary Embodiment>

Figure 15:
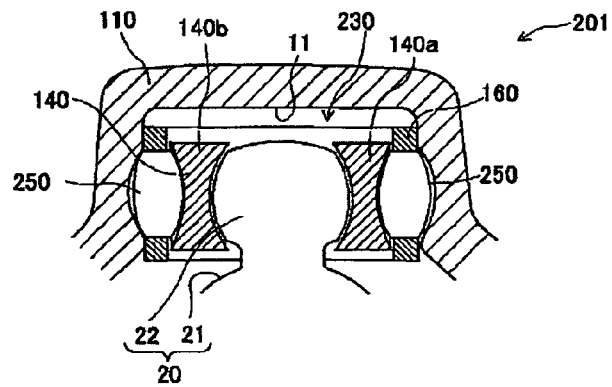
FIG. 15 shows a third exemplary embodiment: a radially sectional view of a part of a constant velocity joint 201.

Now, a constant velocity joint 201 of a third exemplary embodiment will be described below by referring to FIG. 15. FIG. 15 is a radially sectional view of a part of the constant velocity joint 201 of the third exemplary embodiment. As shown in FIG. 15, the constant velocity joint 201 includes an outer ring 110, a tripod 20 and a roller unit 230. Here, the constant velocity joint 201 of the third exemplary embodiment is different in view of a point that the rolling element 50 of the constant velocity joint 101 of the second exemplary embodiment is changed from the spherical member to a barrel shaped roller. Only different points will be described below.

Namely, the roller unit 230 includes an intermediate member 140, a plurality of rolling elements 250 and a cage 160. The rolling element 250 is the barrel shaped roller and a plurality of rolling elements are arranged so as to circulate on an outer periphery of the intermediate member 140 as in the case of the spherical member and the needle. The barrel shaped roller is the rolling element that has a pillar shape and in which a section cut in the direction orthogonal to the extending direction of the pillar is circular and a part corresponding to an outer peripheral surface in a section cut in the extending direction of the pillar has a circular arc protruding shape.

In accordance with such a structure, the bias of load points respectively applied to the members during the transmission of a power is prevented as in the rolling member 150 of the spherical member in the second exemplary embodiment and a width of the pillar in the direction orthogonal to the extending direction of the pillar can be decreased more than that of the spherical member. As a result, an entire part of the constant velocity joint 201 can be made to be compact.

<Fourth Exemplary Embodiment>

Figure 16:
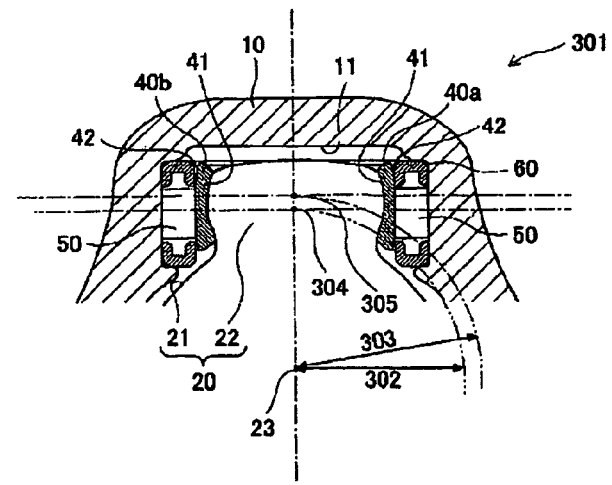
FIG. 16 shows a fourth exemplary embodiment: a radially sectional view of a part of a constant velocity joint 301.

A constant velocity joint 301 of a fourth exemplary embodiment will be described below by referring to FIG. 16. When the structure of the constant velocity joint 1 of the first exemplary embodiment is set as a basic structure, in the constant velocity joint 301 of the fourth exemplary embodiment, an outer ring PCR (pitch circle radius) 302 and a tripod PCR 303 are set so as to be different from each other. FIG. 16 is a radially sectional view of a part of the constant velocity joint 301 of the fourth exemplary embodiment. Since the constant velocity joint 301 of the fourth exemplary embodiment is substantially formed with the same structure as that of the constant velocity joint 1 of the first exemplary embodiment, the same reference numerals are respectively used for components.

As shown in FIG. 16, outer peripheral surfaces of tripod shaft parts 22 have spherically protruding shapes. Under a position where a rotation axis 13 of an outer ring coincides with a rotation axis 23 of an intermediate shaft, the tripod PCR 303 is set to be larger than the outer ring PCR 302.

In a rolling element 50 located between a power transmission surface 42 and side surfaces of raceway grooves 11, the outer ring PCR 302 indicates the shortest distance between an intersection 304 on a tripod axis on a plane passing thorough the center of width of the rolling element 50 in the axial direction of a tripod (a vertical direction in FIG. 16) and orthogonal to the tripod axis and the rotation axis 13 of the outer ring. The tripod PCR 303 indicates the shortest distance between a center of curvature 305 of the outer peripheral surfaces of the tripod shaft parts 22 and the rotation axis 23 of the intermediate shaft.

Figure 17:
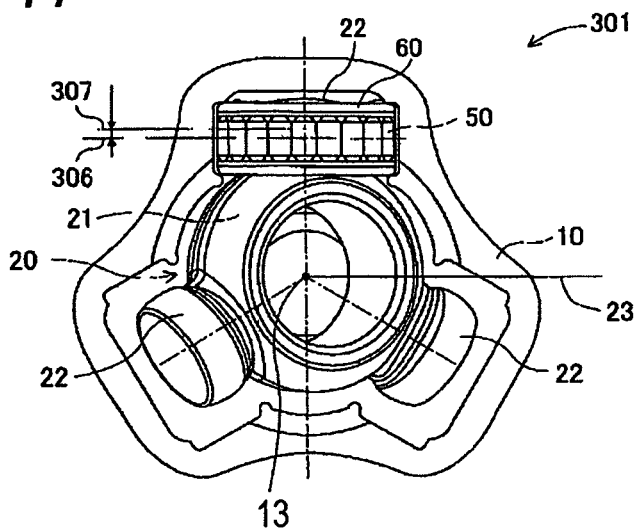
FIG. 17 is a diagram seen from an opening side of an outer ring 10 in the constant velocity joint 301 to which a prescribed joint angle is applied.
Figure 18:
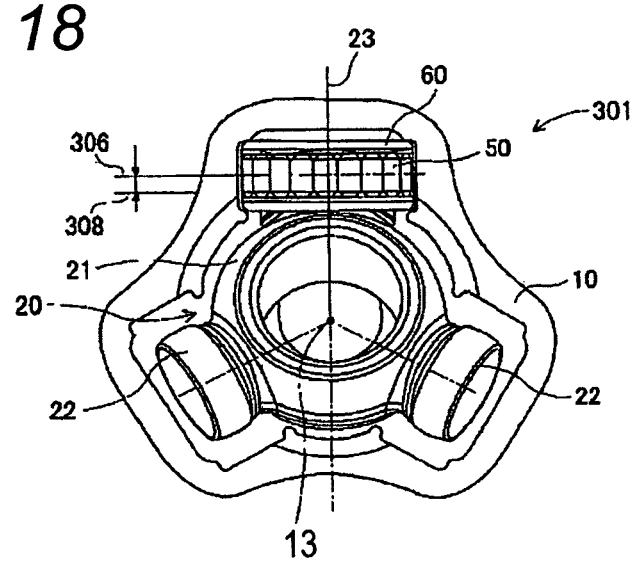
FIG. 18 is a diagram seen from an opening side of the outer ring 10 in the constant velocity joint 301 to which a prescribed joint angle is applied.
Figure 19:
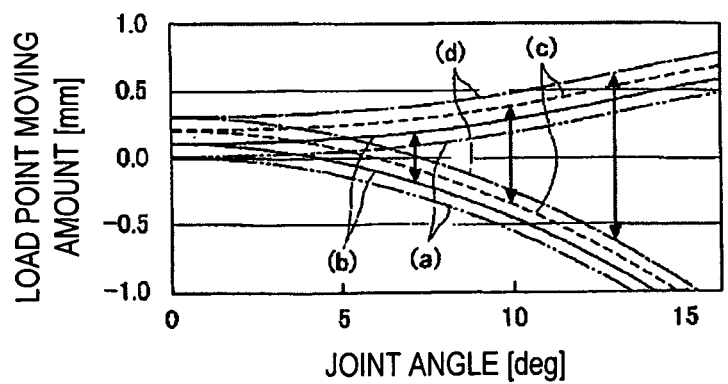
FIG. 19 is a graph showing a joint angle and a maximum and minimum contact point moving amount for each offset amount.

Now, by referring to FIG. 17 and FIG. 18, an explanation will be given below. FIG. 17 is a diagram seen from an opening side of an outer ring 10 in the constant velocity joint 301 to which a prescribed joint angle is applied. FIG. 18 is a diagram seen from the opening side of the outer ring 10 in the constant velocity joint 301 to which a prescribed joint angle is applied. FIG. 19 is a graph showing a joint angle and a maximum and minimum moving amount of a load point for each offset amount. In FIG. 19, (a) shows an offset amount of 0 mm, (b) shows an offset amount of 0.1 mm, (c) shows an offset amount of 0.2 mm and (d) shows an offset amount of 0.3 mm. The load point is a position in the radial direction of the outer ring of a position to which a load is applied during a power transmission between the tripod shaft parts 22 and intermediate members 40a and 40b.

As shown in FIG. 17 and FIG. 18, when the joint angle is applied, the load point moves depending on a rotation phase. Here, the load point when the joint angle is 0 deg is set as a reference load point 306.

For instance, in FIG. 17, the rotation axis 23 of the intermediate shaft is applied as the joint angle in a rightward direction of FIG. 17. Under this state, a tripod 20 rotates together with the intermediate shaft and one of the tripod shafts 22 is located in an upward direction of FIG. 17. Then, as described above, the tripod 20 eccentrically rotates relative to the outer ring 10. This eccentric rotation causes a first load point 307 to move outward in the radial direction of the outer ring 10 from the reference load point 306 and to be located at a position most separating from the rotation axis 23 of the outer ring.

On the other hand, in FIG. 18, the rotation axis 23 of the intermediate shaft is applied as the joint angle in an upward direction of FIG. 18. Under this state, the tripod 20 rotates together with the intermediate shaft and one of the tripod shafts 22 is located in an upward direction of FIG. 18. Then, an eccentric rotation of the tripod 20 causes a second load point 308 to move inward in the radial direction of the outer ring 10 from the reference load point 306 and to be located at a position closest to the rotation axis 13 of the outer ring.

A moving amount of the first load point 307 from the reference load point 306 is smaller than a moving amount of the second load point 308 form the reference load point 306. If the outer ring PCR 302 is set to coincide with the tripod PCR 303, a moving amount average of the load points of the tripod shaft parts 22 applied to a roller unit 30 is biased to a direction toward the rotation axis 13 of the outer ring. Accordingly, this causes a partial abrasion of the rolling elements 50 to be increased.

Thus, the tripod PCR 303 is previously set (offset) to be larger than the outer ring PCR 302, so that the moving amount average of the load points is located at a center of the thickness of the roller unit 30 and the deviation of the load can be prevented. However, since the moving amounts of the first load point 307 and the second load point 308 from the reference load point 306 respectively depend on an applied joint angle, optimum offset amounts are different depending on the prescribed joint angle. As shown in FIG. 19, when maximum values and minimum values of the moving load points are seen at the joint angles in the offset amounts respectively, for instance, if the joint angle is 7 deg, it is requested that the offset amount of 0.1 mm is optimum. Similarly, if the joint angle is 10 deg, it is requested that the offset amount of 0.2 mm is optimum. If the joint angle is 13 deg, it is requested that the offset amount of 0.3 mm is optimum respectively.

Accordingly, when the constant velocity joint is used, the offset amount is set depending on a supposed and ordinarily used joint angle. Thus, the increase of the partial abrasion of the rolling elements 50 can be prevented. As a result, the durability of the constant velocity joint can be improved and vibration or noise can be reduced.

<Fifth Exemplary Embodiment>

Figure 20:
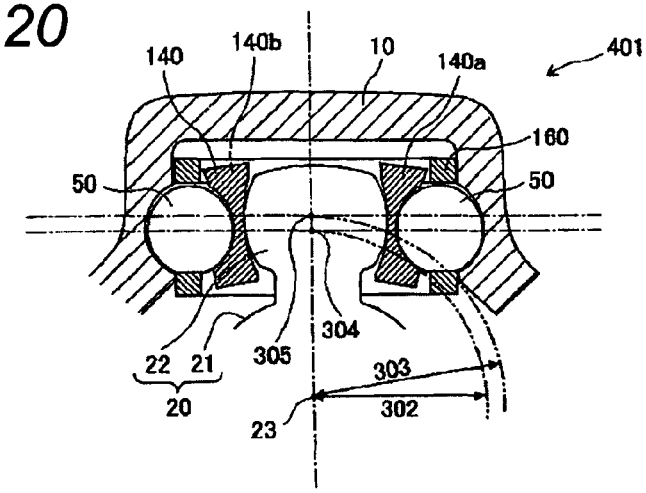
FIG. 20 shows a fifth exemplary embodiment: a radially sectional view of a part of a constant velocity joint 401.
Figure 21:
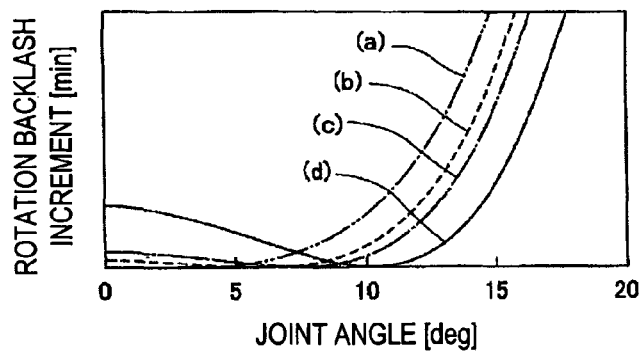
FIG. 21 is a graph showing a joint angle and a rotation backlash for each offset amount.
Figure 22:
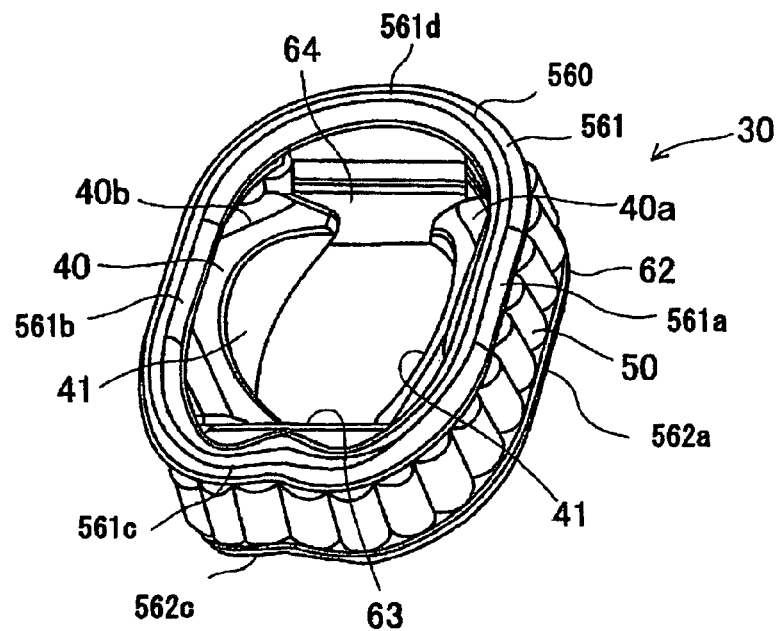
FIG. 22 is a perspective view of a roller unit 530.
Figure 23:
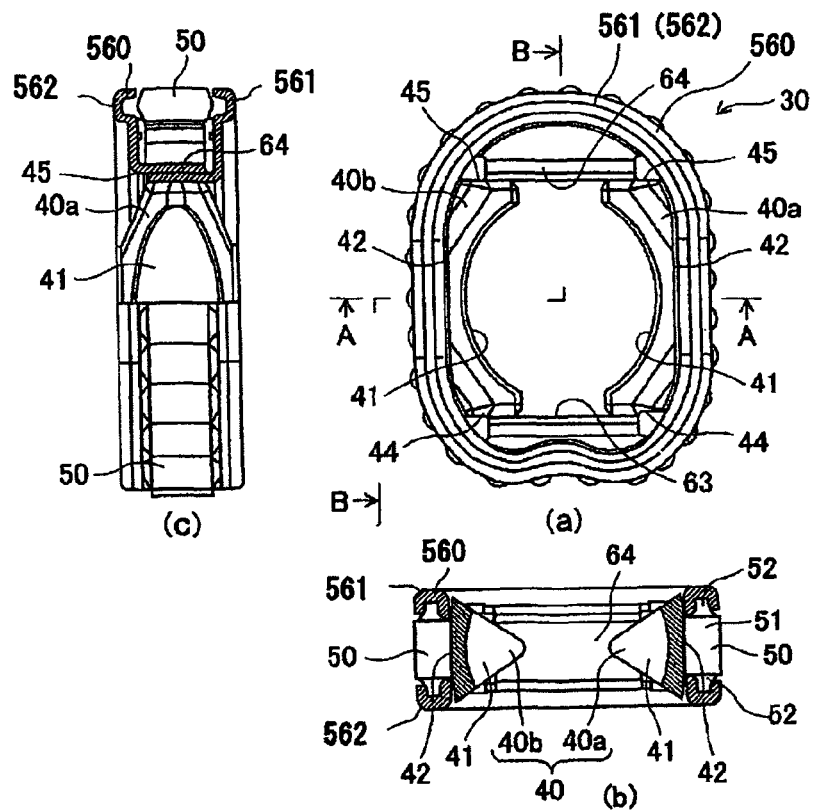
FIG. 23(a) is a plan view of the roller unit 530.
FIG. 23(b) is a sectional view of the roller unit 530 taken along a line A-A (a sectional view of a minor axis side) and FIG. 23(c) is a partly sectional view of the roller unit 530 taken along a line B-B (a diagram including a partial section of a major axis side).

Now, a constant velocity joint 401 of a fifth exemplary embodiment will be described below by referring to FIG. 20 and FIG. 21. FIG. 20 is a radially sectional view of a part of the constant velocity joint 401 of the fifth exemplary embodiment. FIG. 21 is a graph showing a joint angle and a rotation backlash for each offset amount. In FIG. 21, (a) shows an offset amount of 0 mm, (b) shows an offset amount of 0.2 mm, (c) shows an offset amount of 0.3 mm and (d) shows an offset amount of 0.6 mm.

A rolling element 50 is a spherical member. In this case, as described in the fourth exemplary embodiment, when an outer ring PCR 302 is set to coincide with a tripod PCR 303 as a result of an eccentric rotation of a tripod 20, a moving amount average of load points is biased to a direction toward the rotation axis 13 of an outer ring. When the joint angle is 0 deg at which the bias does not arise, a rotation backlash is minimum. A problem arises that as the joint angle is more applied, the rotation backlash is more increased.

Thus, as shown in FIG. 20, the tripod PCR 303 is previously set (offset) to be larger than the outer ring PCR 302 so that the rotation backlash can be made to be minimum when a prescribed joint angle is applied to prevent the increase of the rotation backlash. However, since an amount of the rotation backlash depends on an applied joint angle, optimum offset amounts are different depending on the prescribed joint angle. As shown in FIG. 21, when the increases of the rotation backlash are seen at the joint angles in the offset amounts respectively, for instance, if the joint angle is 6 deg, it is requested that the offset amount of 0.2 mm is optimum. Similarly, if the joint angle is 7 deg, it is requested that the offset amount of 0.3 mm is optimum. If the joint angle is 10 deg, it is requested that the offset amount of 0.6 mm is optimum respectively.

Accordingly, when the constant velocity joint is used, the offset amount is set depending on a supposed and ordinarily used joint angle. Thus, the increase of the rotation backlash of the rolling elements 50 can be prevented. As a result, the durability of the constant velocity joint can be improved and vibration or noise can be reduced. When the rolling element is a barrel shaped roller, when the tripod PCR 303 is set as described above, the same effects can be obtained.

<Sixth Exemplary Embodiment>

A constant velocity joint 501 of a sixth exemplary embodiment will be described by using FIGS. 22 to 26. The same members as those of the first exemplary embodiment are designated by the same reference numerals and an explanation thereof will be omitted.

Figure 24:
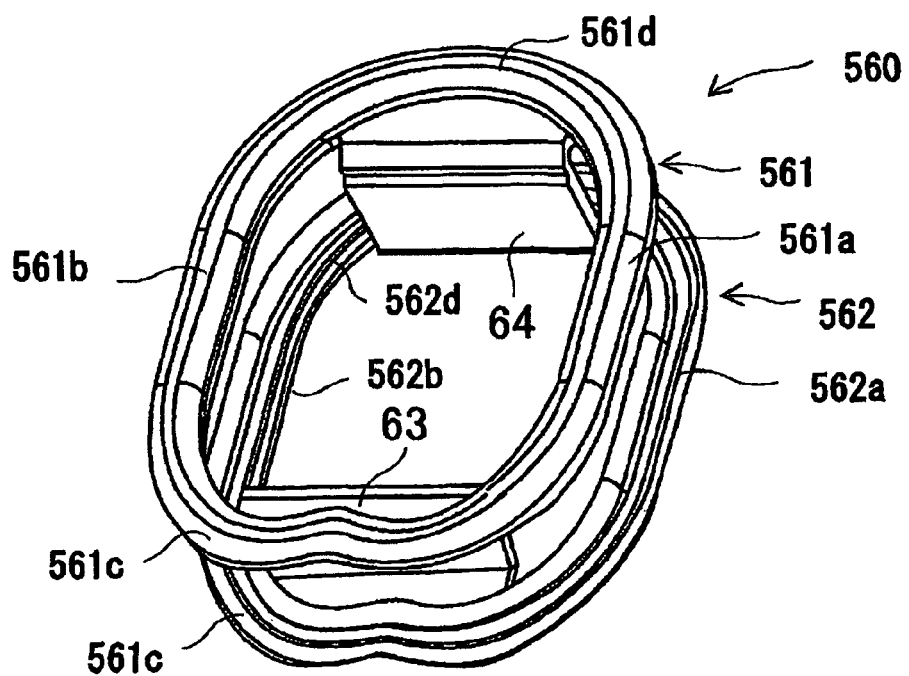
FIG. 24 is a perspective view of a cage 560.
Figure 25:
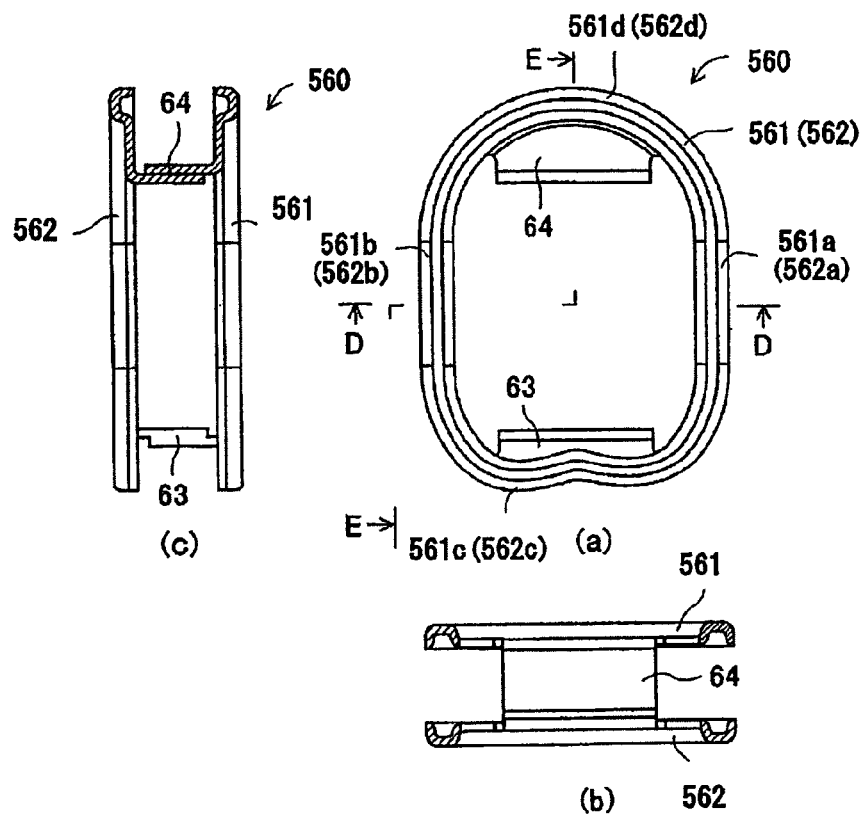
FIG. 25(a) is a plan view of the cage 560.
FIG. 25(b) is a sectional view of the cage 560 taken along a line D-D (a sectional view of a minor axis side) and FIG. 25(c) is a sectional view of the cage 560 taken along a line E-E (a diagram including a partial section of a major axis side).

As shown in FIGS. 24 and 25(a), a cage 560 has an annular shape as an entire form. The cage 560 includes a pair of circulating path forming members 561 and 562 that form a circulating path of rolling elements 50 and a pair of connecting parts 63 and 64. The one pair of circulating path forming members 561 and 562 are located in peripheral edges of the cage 560 and have elliptic forms. The one pair of circulating path forming members 561 and 562 have such forms as to surround one pair of intermediate members 540a and 540b.

As shown in FIG. 24, the circulating path forming member 561 includes a first circulating path 561a, a second circulating path 561b, a third circulating path 561c and a fourth circulating path 561d. The first circulating path 561a and the second circulating path 561b are formed with opposed straight lines.

The third circulating path 561c connects one ends of the first circulating path 561a and the second circulating path 561b together and is formed in a bent shape protruding in the direction toward tripod shaft parts. More specifically, the third circulating path 561c is formed with a substantially W shaped curve when the third circulating path is seen from the axial direction of the cage 560. Tangential lines at both ends of the third circulating path 561c are respectively formed so as to substantially coincide with tangential lines of the one ends of the first circulating path 561a and the second circulating path 561b. A central part in the circumferential direction of the third circulating path 561c (the same as a central part in the circumferential direction of an outer ring 10) is most bent in a protruding shape in the direction toward the tripod shaft parts. This bent part in a protruding shape is formed in a circular arc shape. A curvature radius of the circular arc shape is set to a radius substantially the same as an outside diameter of a part of an intermediate shaft that comes close to the cage 560 or a radius smaller than the outside diameter. Further, two trough parts of the W shape of the third circulating path 561c are also formed in circular arc shapes.

The fourth circulating path 561d is formed with a fourth semi-circular arc shaped circulating path 561d connects the other ends of the first circulating path 561a and the second circulating path 561b together. Further, the other circulating path forming member 562 includes, like the above-described circulating path forming member 561, first, second, third and fourth circulating paths 562a, 562b, 562c and 562d.

Further, the third circulating path 561c is bent in a protruding shape in the direction toward the tripod shaft parts (upward in FIG. 25(a)). However, as shown in FIG. 25(c), the third circulating path is not bent in the axial direction of the cage 560 (in a radial direction of the outer ring 10 under a state that the cage 560 is attached to the outer ring 10) (a transverse direction in FIG. 25(c)). Namely, a circulating locus formed by the third circulating paths 561c and 562c is a locus in the same plane having no component in the axial direction of a tripod.

Further, the one pair of circulating path forming members 561 and 562 are respectively configured in U shaped sectional forms into which a small diameter shaft part 52 of the rolling element 50 can be inserted and with which a cylindrical part 51 is engaged. Namely, a width (a distance between an inner peripheral edge and an outer peripheral edge) of the one pair of circulating path forming members 561 and 562 is formed to be smaller than a maximum diameter of the cylindrical part 51 of the rolling element 50. Under a state that the U shaped opening sides of the circulating path forming members 561 and 562 are spaced by a distance longer than the axial length of the cylindrical part 51 of the rolling element 50, the U shaped opening sides are provided so as to be opposed to each other. A maximum width between the one pair of circulating path forming members 561 and 562 in an opposing direction is set to be slightly smaller than the width of the side surfaces of raceway grooves 11. Namely, the cage 560 is provided so that an inclination thereof may be regulated relative to the raceway grooves 11 by groove bottom surfaces and the engaging protrusions 12 of the raceway grooves 11 and the cage may be inserted into the raceway grooves 11.

The one pair of connecting parts 63 and 64 respectively connect together central parts (upper and lower end parts in FIG. 25(a)) in the circumferential direction of the third circulating path 561c and the fourth circulating path 561d of the one pair of circulating path forming members 561 and 562. Namely, as shown in FIG. 25(c), a part between the one pair of circulating path forming members 561 and 562 is opened in a part excluding the connecting parts 63 and 64.

The connecting parts 63 and 64 are configured in U shaped forms opened outward the cage 560. Bottom surfaces opposite to opening sides of the U shaped forms of the connecting parts 63 and 64 (an inner side of the cage 560) are formed to be flat. The bottom surfaces opposite to the opening sides of the U shaped forms of the one pair of connecting parts 63 and 64 are provided so as to be parallel and opposed to each other. A clearance between the bottom surfaces opposite to the opening sides of the U shaped forms of the one pair of connecting parts 63 and 64 substantially coincide with a distance between axial end faces 44 and 45 of the intermediate members 40a and 40b respectively. Bottom surfaces and opening sides (an outer side of the cage 560) of the U shaped forms of the connecting parts 63 and 64 are formed to be flat in parallel with the bottom surfaces opposite to the opening sides.

Further, one of end parts of the opening sides of the U shaped forms of the connecting parts 63 and 64 are respectively connected to the central parts in the circumferential direction of the third circulating path 561c and the fourth circulating path 561d of the circulating path forming member 561 and the other of the end parts are respectively connected to the central parts in the circumferential direction of the third circulating path 562c and the fourth circulating path 562d of the circulating path forming member 562.

Then, into the U shaped forms of the one pair of circulating path forming members 561 and 562, the small diameter shaft parts 52 of the rolling element 50 are inserted. In such a way, the rolling element 50 is supported by the one pair of circulating path forming members 561 and 562. Namely, the one pair of circulating path forming members 561 and 562 support the rolling elements 50 so that the plurality of rolling elements 50 may circulate on the outer peripheries of the one pair of intermediate members 40a and 40b. Here, the U shaped forms of the one pair of circulating path forming members 561 and 562 have small clearances relative to the outer peripheral surfaces of the small diameter shaft parts 52 of the rolling element 50. Further, under a state that the small diameter shaft parts 52 of the rolling element 50 are inserted into the circulating path forming members 561 and 562, the cylindrical part 51 of the rolling element 50 protrudes inside from the inner peripheral edges of the circulating path forming members 561 and 562 and protrudes outside from the outer peripheral edges of the circulating path forming members 561 and 562.

Here, under a state that the one pair of intermediate members 40a and 40b are arranged in the outer peripheral sides of the tripod shaft parts 22 and the one pair of intermediate members 40a and 40b are arranged inside the cage 560, the first circulating paths 561a and 562a and the second circulating paths 561b and 562b (right and left straight line parts in FIG. 25(a)) of the circulating path forming members 561 and 562 are respectively arranged between power transmission surfaces 42 of the intermediate members 40a and 40b and the side surfaces of the raceway groove 11 so as to be substantially parallel to both the surfaces (in a following state).

Namely, the circulating paths formed by the first circulating paths 561a and 562a and the second circulating paths 561b and 562b form circulating paths when the rolling element 50 moves on the power transmission surfaces 42. Further, at least in one between the first circulating paths 561a and 562a, the second circulating paths 561b and 562b, the power transmission surfaces 42 and the side surfaces of the raceway grooves 11, a clearance is formed.

Further, both end parts of the third circulating paths 561c and 562c and the fourth circulating paths 561d and 562d of the one pair of circulating path forming members 561 and 562 are arranged so as to define introducing surfaces formed in both the end parts of the power transmission surfaces 42 of the intermediate members 40a and 40b. Namely, the circulating paths formed by both the end parts of the third circulating paths 561c and 562c and the fourth circulating paths 561d and 562d form circulating paths when the rolling element 50 moves on the introducing surfaces. The circulating paths are connected to the circulating paths formed by the first circulating paths 561a and 562a and the second circulating paths 561b and 562b so as to be smoothly continuous thereto. Further, clearances are formed between both the end parts of the third circulating paths 561c and 562c and the fourth circulating paths 561d and 562d that form the circulating paths and the introducing surfaces. It is to be understood that clearances are formed between both the end parts of the third circulating paths 561c and 562c and the fourth circulating paths 561d and 562d that form the circulating paths and the side surfaces of the raceway grooves 11.

When the tripod shaft parts 22 are reciprocated in the extending direction of the raceway grooves 11, a roller unit 530 arranged in an outer peripheral side of the tripod shaft parts 22 is also reciprocated. In the reciprocating movement of the roller unit 530, when the roller unit 530 is located at a position of a most interior side of the outer ring 10, the intermediate shaft comes closest to the cage 560 of the roller unit 530. Here, when the cage 560 interferes with the intermediate shaft at a prescribed joint angle, an angle immediately before the interference arises is a maximum joint angle which can be taken by the outer ring 10 and the intermediate shaft.

Figure 26:
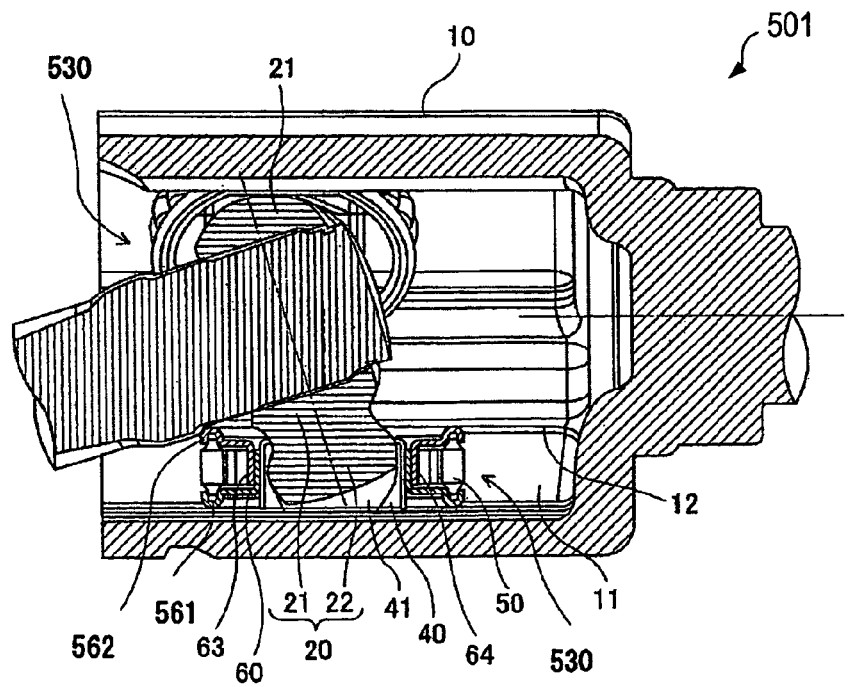
FIG. 26 is a sectional view seen from a direction orthogonal to a rotation axis of an outer ring 10 in an attached state of a part of a constant velocity joint 501.

Here, the central part in the circumferential direction of the third circulating paths 561c and 562c (the same as the central part in the circumferential direction of the outer ring 10) is most bent in the protruding shape in the direction toward the tripod shaft parts. Thus, as shown in FIG. 26, since, an end part of the roller unit 530 in an opening side of the outer ring 10 is moved more to an interior side of the outer ring 10 than a usual position, the intermediate shaft can take the more the angle. Further, the bent shape of the cage 560 is formed in a circular arc recessed shape corresponding to an outer peripheral surface of the intermediate shaft which comes close to the cage 560 when the intermediate shaft is bent with respect to the rotation axis of the outer ring 10. As a result of these things, the maximum joint angle can be increased. Namely, in order to reduce a width of the roller unit 530 in the direction of the rotation axis of the outer ring 10, a block for transmitting a power is not shortened, the outside diameter of the outer ring 10 is not enlarged, and a function can be maintained for sufficiently transmitting the power and the maximum joint angle can be increased.

<Modification of Sixth Exemplary Embodiment>

Figure 27:
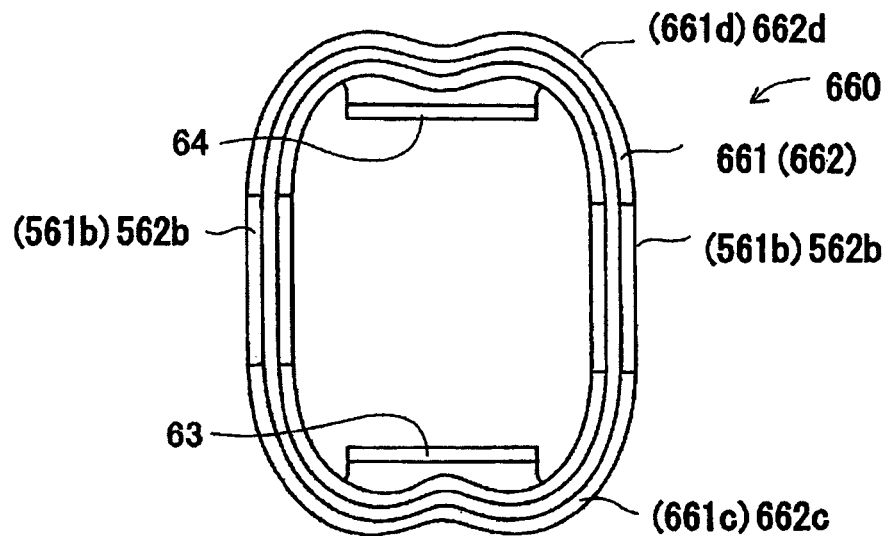
FIG. 27 is a top view of a cage 660.
Figure 28:
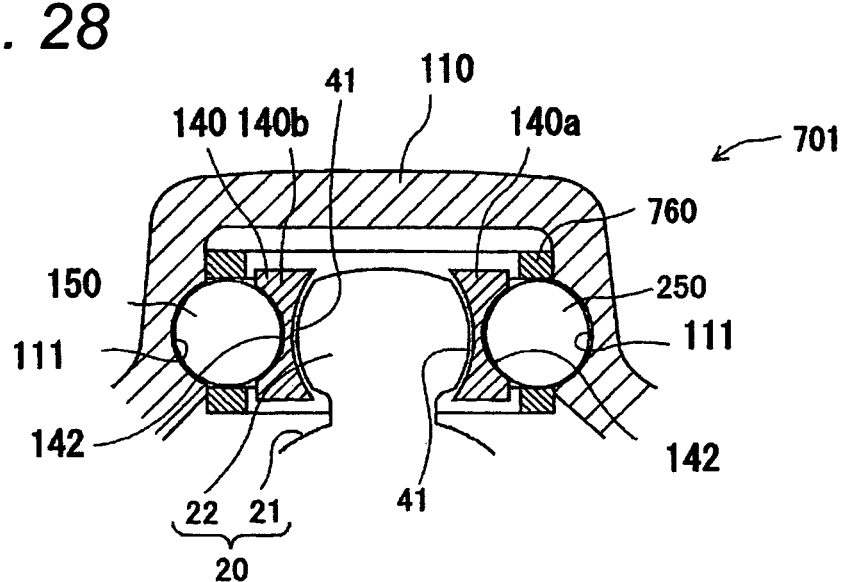
FIG. 28 shows a seventh exemplary embodiment: a radially sectional view of a part of a constant velocity joint 701.
Figure 29:
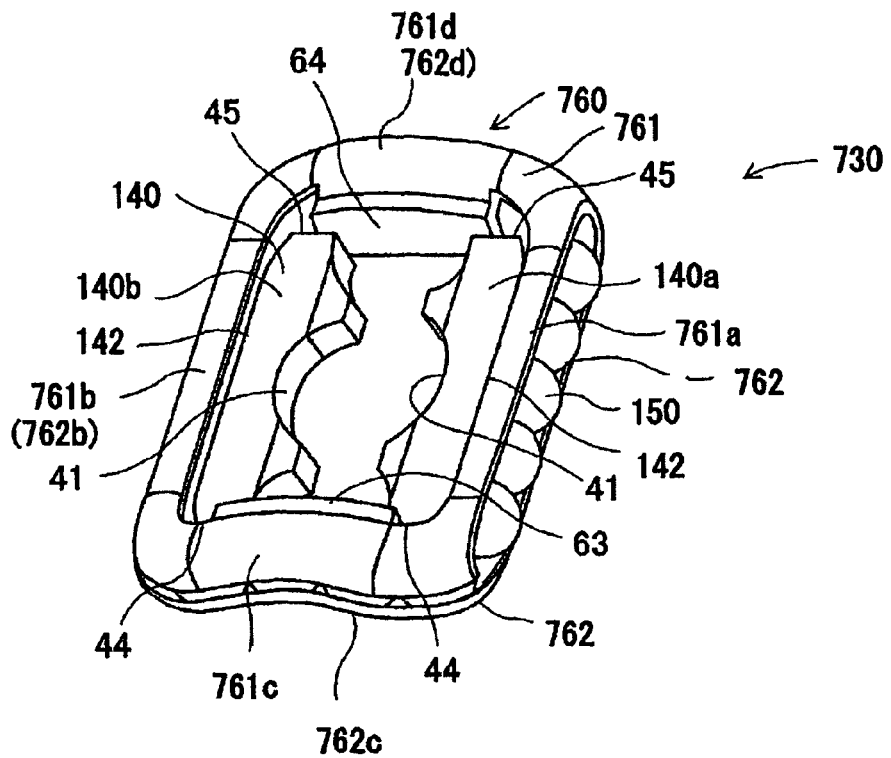
FIG. 29 is a perspective view in an attached state of a part of the constant velocity joint 701.

In the above-described sixth exemplary embodiment, the fourth circulating paths 561d and 562d of the cage 560 have semi-circular arc shapes. However, the cage is not limited to this form and may have a below-described form. A cage 660 of a modification of the sixth exemplary embodiment will be described by referring to FIG. 27. FIG. 27 is a plan view of the cage 660 as the modification of the sixth exemplary embodiment.

As shown in FIG. 27, the cage 660 includes a pair of circulating path forming members 661 and 662 that form a circulating path of rolling elements 50 and a pair of connecting parts 563 and 564. Fourth circulating paths 661d and 662d of the cage 660 formed by the one pair of circulating path forming members 661 and 662 are configured in bent shapes protruding in the direction coming close to tripod shaft parts. More specifically, the fourth circulating paths 661d and 662d are formed with substantially W shaped curves as shown in FIG. 27 when the fourth circulating paths are seen from the axial direction of the cage 660. First to third circulating paths 561a to 561c and 562a to 562c are the same as those of the sixth exemplary embodiment. That is, the cage 660 is formed in a symmetrical shape relative to the tripod shaft parts 22 as a whole.

Additionally, an intermediate member 40 is not formed with separate members so as to form a pair and may be formed as an integral member. In this case, other structures are the same as those of the sixth exemplary embodiment. Namely, the intermediate member 40 as the integral member is arranged so as to cover the outer peripheral surfaces of the tripod shaft parts 22 and the cage 660 is arranged outside the intermediate member. Thus, the tripod shaft parts 22 and the intermediate member 40 as the integral member can slide.

In such a way, when the cage 660 is formed in a symmetrical shape, between the third circulating paths 561c and 562c and the fourth circulating paths 561d and 562d, substantially, there is no difference. Accordingly, when a constant velocity joint 501 is attached, a direction that a roller unit 30 including the cage 660 is inserted into raceway grooves 11 of an outer ring 10 does not need to be considered, so that an erroneous attachment can be prevented.

Further, since the intermediate member 40 can interrupt an operation of a power transmission to a back surface side of the power transmission, the one pair of intermediate members formed with the separate members are preferably used, however, when the intermediate member is not formed with the separate members, but formed with the integral member, effects of the present invention are also achieved.

<Seventh Exemplary Embodiment>

A constant velocity joint of a seventh exemplary embodiment will be described by referring to FIG. 28 to FIG. 31. Parts corresponding to those of the secondary exemplary embodiment are designated by the same reference numerals and an explanation thereof will be omitted.

The roller unit 530 of the sixth exemplary embodiment and a roller unit 730 of the seventh exemplary embodiment are different from each other mainly view of three points. A first point resides in that a rolling element 50 is changed to a spherical member from a needle. A second point resides in that a bending direction of the bent part in a protruding shape in the third circulating paths 561c and 562c of the cage 560 is changed to an outward direction in the radial direction of an outer ring from the direction toward the tripod shaft parts. A third point resides in that a width of an opening part in the third circulating paths 561c and 562c and the fourth circulating paths 561d and 562d is set to be smaller than a width of an opening part in the first circulating paths 561a and 562a and the second circulating paths.

In accordance with the change of the first point, the forms of side surfaces of raceway grooves 111 of an outer ring 110, configurations of outer surfaces of one pair of intermediate members 140 and forms of parts of a cage 160 for supporting a rolling element 150 are different from those of the constant velocity joint 501 of the sixth exemplary embodiment.

Figure 30:
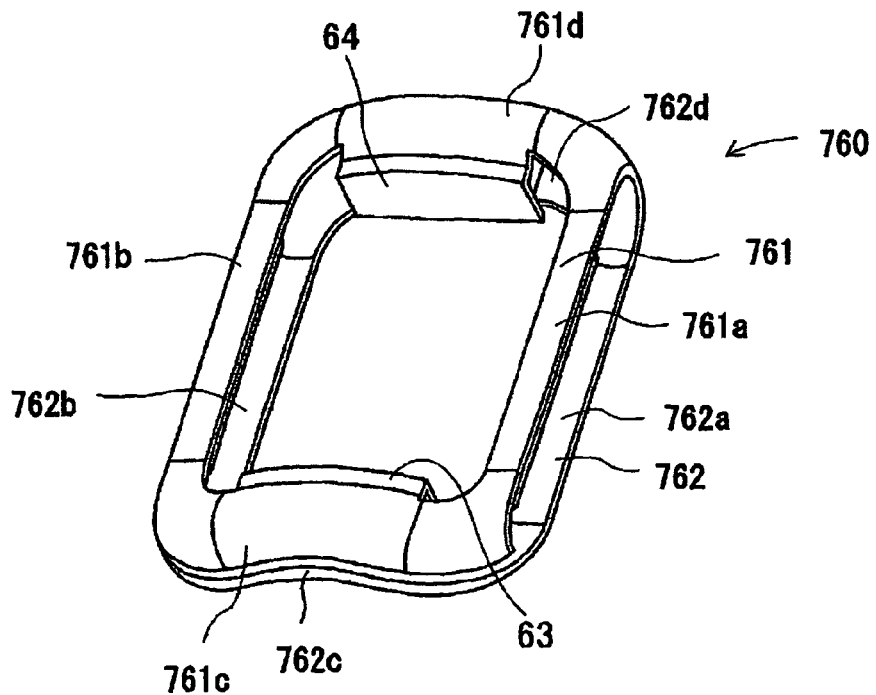
FIG. 30 is a perspective view of a cage 760.
Figure 31:
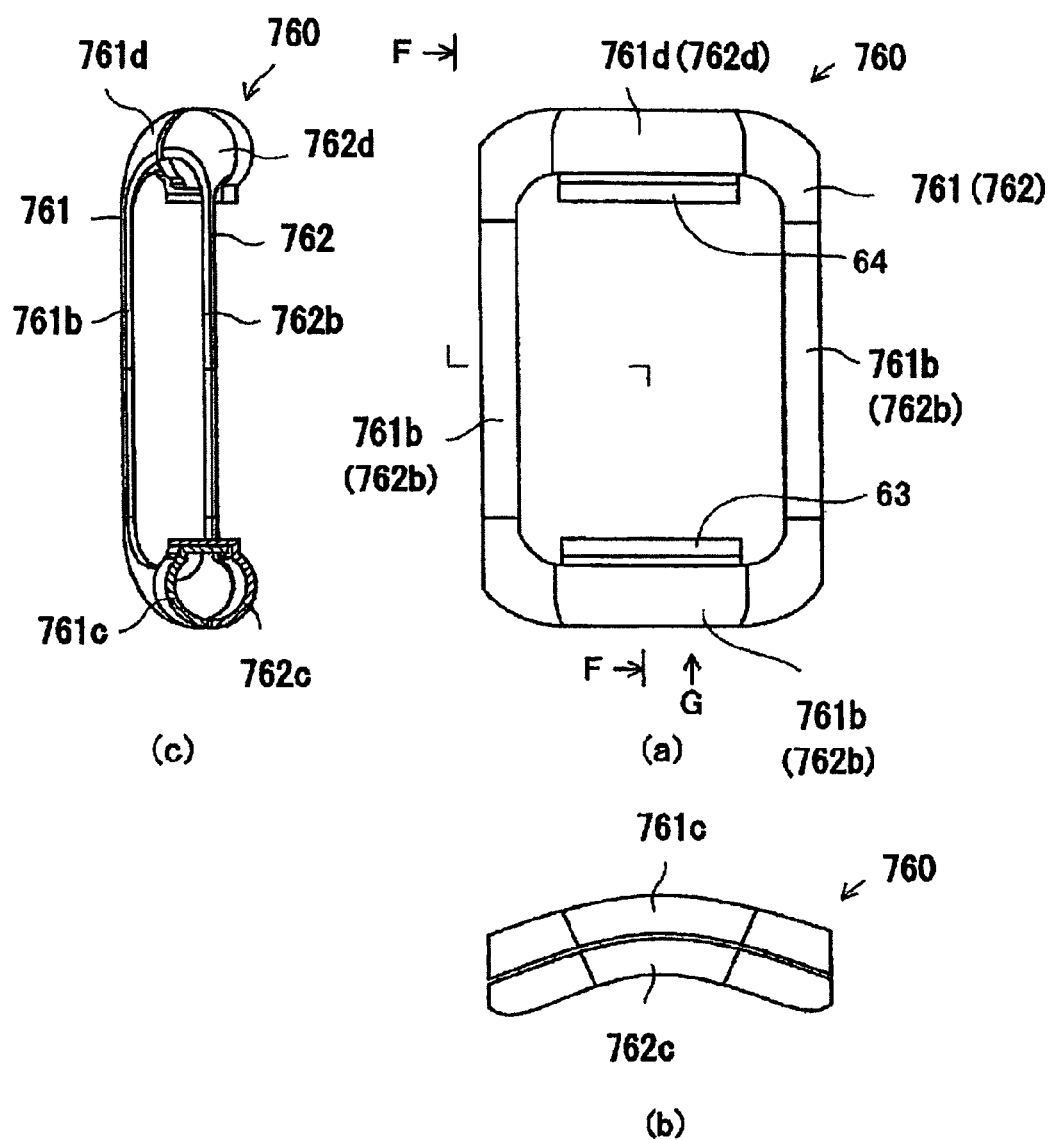
FIG. 31(a) is a plan view of the cage 760.
FIG. 31(b) is a view of the cage 760 seen from a direction F (a sectional view of a minor axis side) and FIG. 31(c) is a sectional view of the cage 760 taken along a line F-F (a diagram including a partial section of a major axis side).

A cage 760 has an annular shape as an entire form similarly to the case that the rolling element is the needle as shown in FIG. 30 and FIG. 31. While the circulating path forming members 561 and 562 that form the cage 560 of the sixth exemplary embodiment are respectively configured in the U shaped forms, circulating path forming members 761 and 762 of the cage 760 of the seventh exemplary embodiment are arranged so as to be opposed in the vertical direction in FIG. 28 and provided with circular arc recessed grooves so as to support the spherical rolling elements 150.

A third circulating path 761c connects one ends of a first circulating path 761a and a second circulating path 761b together and is formed with a bent shape protruding outward in the radial direction of the outer ring. More specifically, the third circulating path 761c is inclined outward in the radial direction of the pouter ring on the above-described one end as a supporting point when the cage 760 is seen from a side surface (in a direction orthogonal to an axis of the cage 760 with the first circulating path 761a set in a transverse direction). A central part of the third circulating path 761c in the circumferential direction is most bent in a protruding shape outward in the radial direction of the outer ring. Further, a third circulating path 762c of the circulating path forming member 762 is formed with a bent shape protruding outward in the radial direction of the outer ring so that a width of the third circulating path 761c and the circulating path opposed thereto is fixed.

Now, an operation of the above-described constant velocity joint 701 will be described below. A circulating path is formed so as to be bent in a protruding shape outward in the radial direction of the outer ring in the third circulating paths 761c and 762c, which is different from the case that the rolling element 150 is the needle. Thus, when the rolling element 150 is discharged from a power transmitting block, the rolling element is circulated so as to come close to bottom surfaces of the raceway grooves 111 toward the central parts of the third circulating paths 761c and 762c in the circumferential direction. Then, after the rolling element passes thorough the central parts in the circumferential direction, the rolling element is circulated to enter a back surface side of the power transmitting block. Further, the opening part in the third circulating paths 761c and 762c and the fourth circulating paths 761d and 762d is set to be narrower than the opening part in the first circulating paths 761a and 762b and the second circulating paths 761b and 762b.

As described above, in the constant velocity joint 701 of the seventh exemplary embodiment, the central parts of the third circulating paths 761c and 762c in the circumferential direction are most bent in protruding shapes outward in the radial direction of the outer ring. Further, the bent shape of the cage 760 is formed in a circular arc recessed shape corresponding to an outer peripheral surface of an intermediate shaft which comes close to the cage 760 when the intermediate shaft is bent with respect to the rotation axis of the outer ring 110. As a result of these things, a maximum joint angle can be increased. Namely, in order to reduce a width of the roller unit 730 in the direction of the rotation axis of the outer ring 110, a block for transmitting a power is not shortened, the outside diameter of the outer ring 110 is not enlarged, and a function can be maintained for sufficiently transmitting the power and a maximum joint angle can be increased.

Further, the rolling element 150 as the spherical member is high in its rigidity and excellent in its circulating property. Further, the spherical member having the small number of working processes is relatively easily produced and an attachment of the constant velocity joint 701 can be simplified.

Further, since the width of the opening parts in the third circulating paths 761c and 762c and the fourth circulating paths 761d and 762d are set to be narrow, even when a large inertia force is generated in the rolling element 150, the rolling element 150 can be prevented from falling from the cage 760. Further, since the first, second, third and fourth circulating paths 761a, 762a, 761b, 762b, 761c, 762c and 761d and 762d have opening parts in outer peripheral sides over all the circumference, under a state that the constant velocity joint 701 is attached, the state of the rolling element 150 can be visually recognized and lubricant can be assuredly allowed to adhere to the rolling element 150 to ensure a good circulation of the rolling elements 150.

When the cage 760 is formed in a symmetrical shape with respect to tripod shaft parts 22, between the third circulating paths 761c and 762c and the fourth circulating paths 761d and 762d, substantially, there is no difference. Accordingly, when the constant velocity joint 701 is attached, a direction that the roller unit 730 including the cage 760 is inserted into the raceway grooves 111 of the outer ring 110 does not need to be considered, so that an erroneous attachment can be prevented.

<Modification of Seventh Exemplary Embodiment>

In the constant velocity joint 701 of the seventh exemplary embodiment, the third circulating paths 761c and 762c are bent in protruding shapes outward in the radial direction of the outer ring 110. In the sixth exemplary embodiment, the third circulating paths 561c and 562c are bent in protruding shapes in the direction toward the tripod shaft parts. Thus, as a modification of the seventh exemplary embodiment, the third circulating paths 761c and 762c may be bent in protruding shapes outward in the radial direction of the outer ring 110 and bent in protruding shapes in the direction toward the tripod shaft parts.

<Eighth Exemplary Embodiment>

A constant velocity joint of an eighth exemplary embodiment will be described by referring to FIG. 32 and FIG. 33. FIG. 30 is a perspective view of a part in an attached state of a constant velocity joint 801 of an eighth exemplary embodiment. FIG. 33 is a perspective view of a cage 860.

Figure 32:
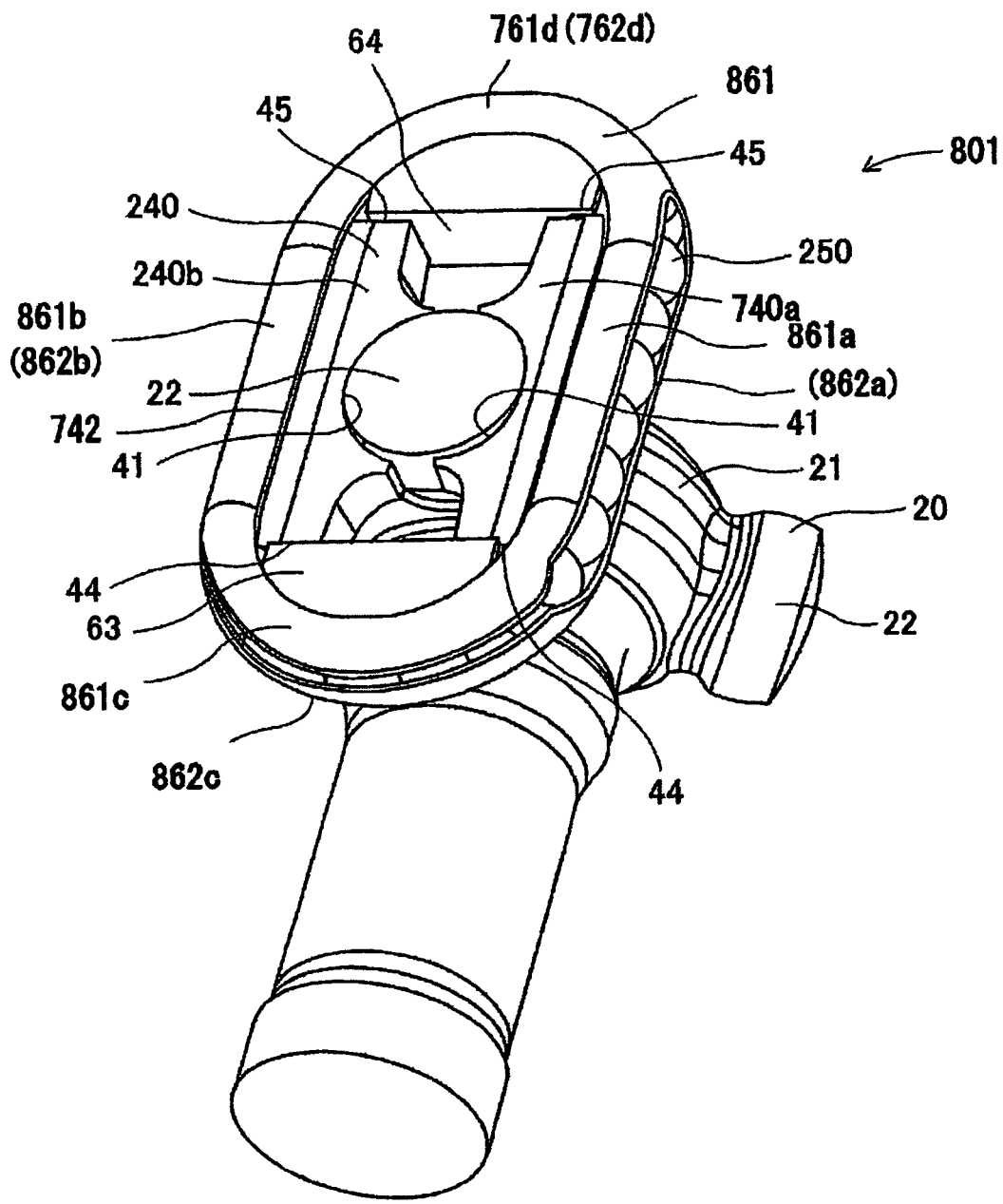
FIG. 32 is a perspective view in an attached state of a part of a constant velocity joint 801 of an eighth exemplary embodiment.
Figure 33:
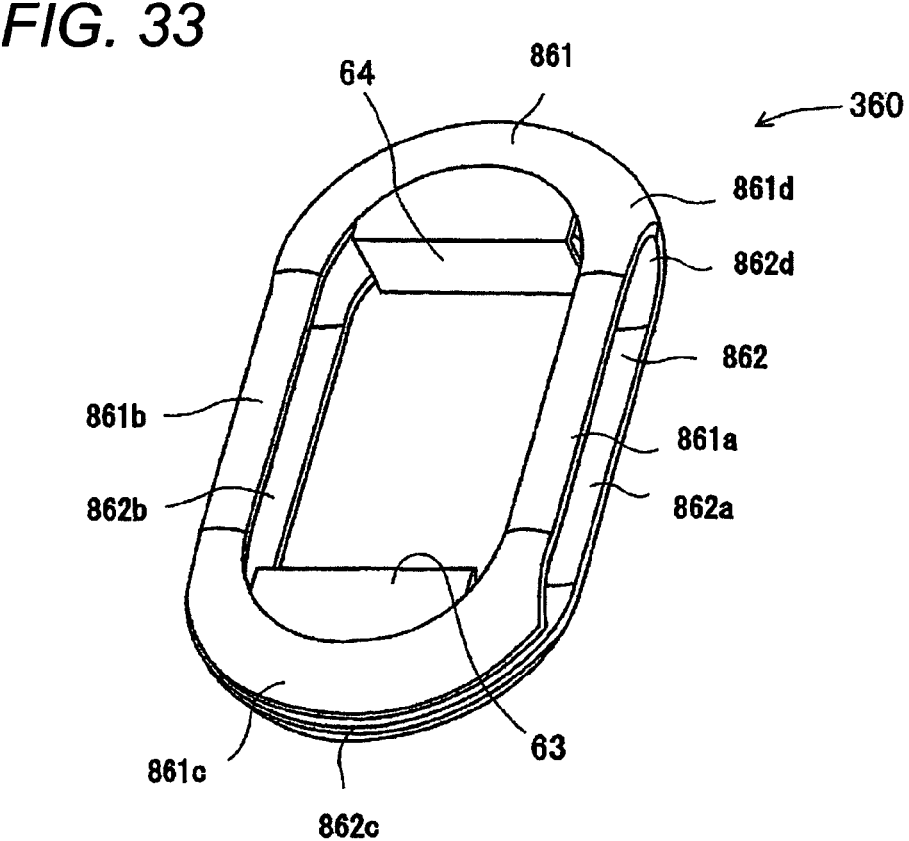
FIG. 33 is a perspective view of a cage 860.

As shown in FIG. 32, the constant velocity joint 801 includes the structure of the constant velocity joint 501 of the sixth exemplary embodiment as a base. The seventh exemplary embodiment is different in view of a point that the third circulating paths 761c and 762c and the fourth circulating paths 761d and 762d of the cage 760 of the seventh exemplary embodiment are not bent in protruding shapes outward in the radial direction of an outer ring nor bent in protruding shapes in the direction toward tripod shaft parts. Now, only a different point will be described below.

A roller unit 830 includes an intermediate member 140, a plurality of rolling elements 150 and a cage 860. As shown in FIG. 32 and FIG. 33, the cage 860 is configured in an elliptic shape as an entire shape by first, second, third and fourth circulating paths 861a, 862a, 861b, 862b, 861c, 862c and 861d and 862d and does not have a bent part protruding outward in the radial direction of an outer ring nor in the direction toward tripod shaft parts. Further, similarly to the cage 760 of the seventh exemplary embodiment, a width of opening parts in the third circulating paths 861c and 862c and the fourth circulating paths 861d and 862d are set to be narrower than a width of an opening part in the first circulating paths 861a and 862a and the second circulating paths 861b and 862b. Further, the cage 860 is formed symmetrically with respect to the tripod shaft parts 22.

In the constant velocity joint 801 of the eighth exemplary embodiment constructed as described above, since the first, second, third and fourth circulating paths 861a, 862a, 861b, 862b, 861c, 862c and 861d and 862d have opening parts in outer peripheral sides over all the circumference, under a state that the constant velocity joint 801 is attached, the state of the rolling element 150 can be visually recognized and lubricant can be assuredly allowed to adhere to the rolling element 150 to ensure a good circulation of the rolling elements 150. Further, even when the opening parts are provided, the width of the opening parts is properly set so that the rolling element 150 may be assuredly prevented from falling from the cage 860. Further, since the cage 860 is formed in a symmetrical shape with respect to the tripod shaft parts, during an attachment of the constant velocity joint 801, a direction that the roller unit 830 including the cage 860 is inserted into raceway grooves 111 of an outer ring 110 does not need to be considered, so that an erroneous attachment can be prevented.

<Ninth Exemplary Embodiment>

Figure 34:
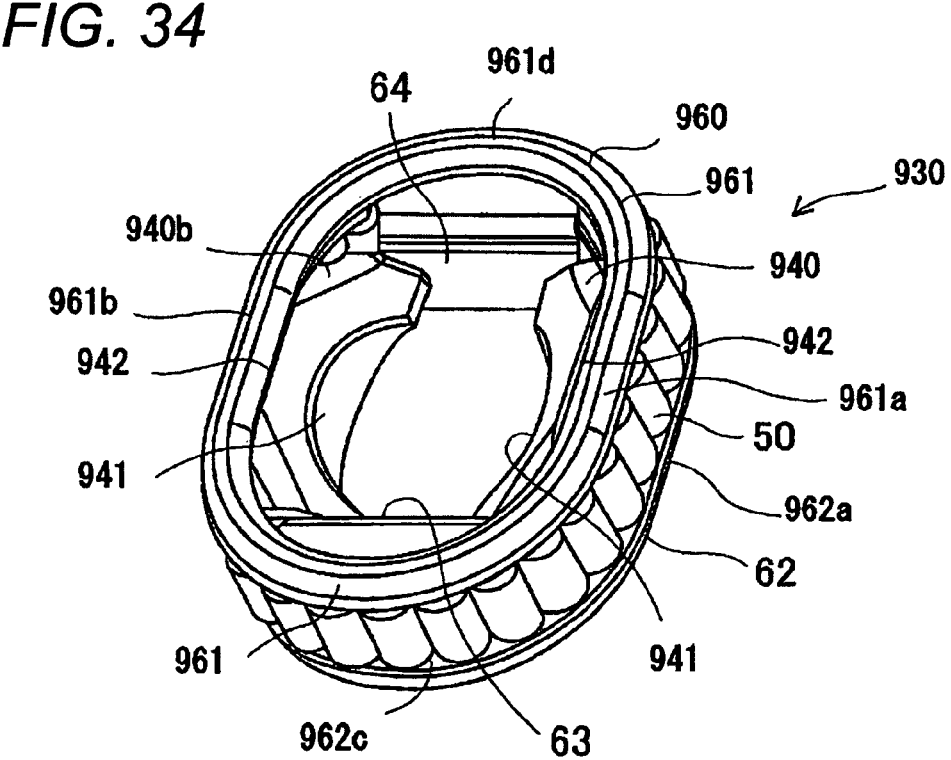
FIG. 34 is a perspective view of a roller unit 930.
Figure 35:
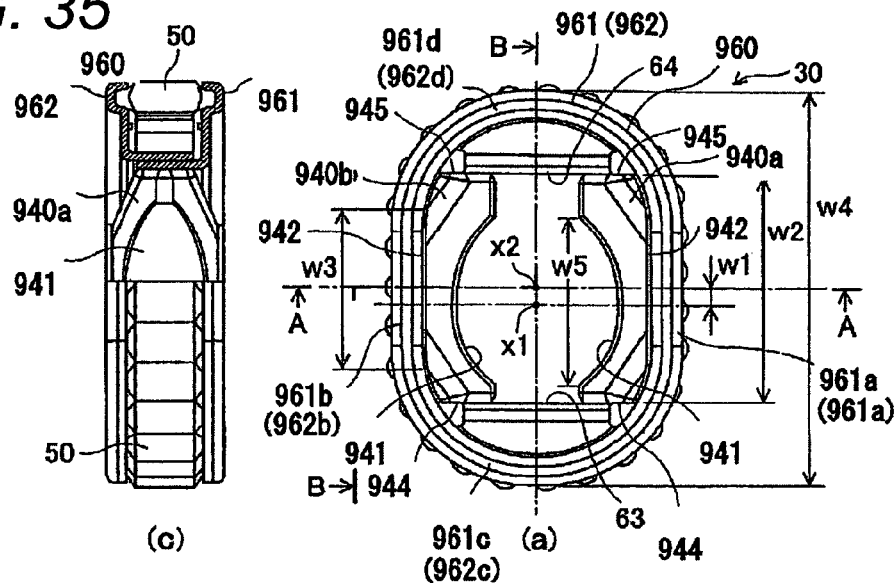
FIG. 35(a) is a plan view of the roller unit 930.
FIG. 35(b) is a sectional view of the roller unit 930 taken along a line A-A (a sectional view of a minor axis side) and FIG. 35(c) is a partly sectional view of the roller unit 930 taken along a line B-B (a diagram including a partial section of a major axis side).
Figure 35:
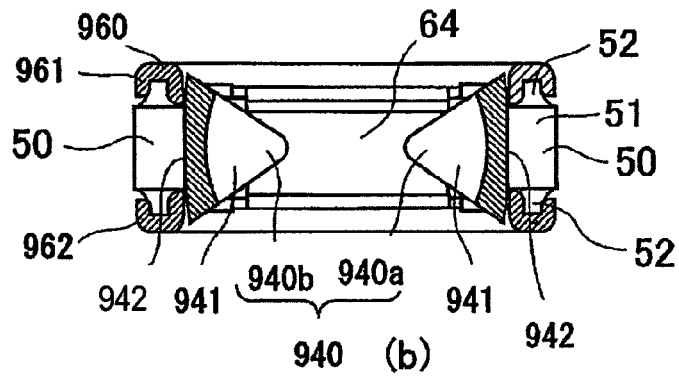
Figure 36:
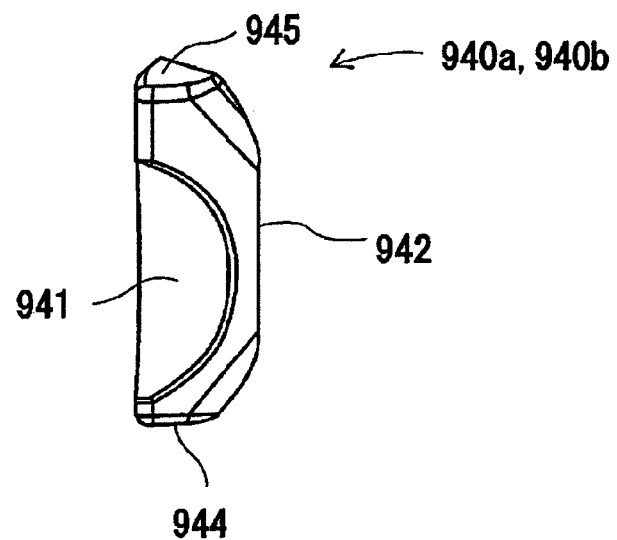
FIG. 36 is one perspective view of a pair of intermediate members 940.
Figure 37:
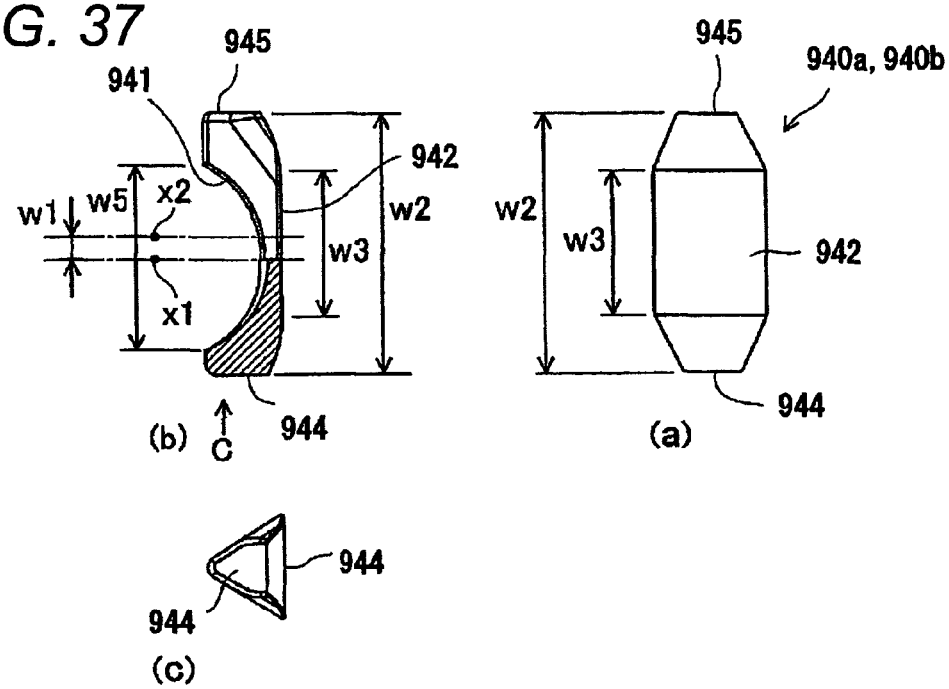
FIG. 37(a) is a front view of the intermediate member 940.
FIG. 37(b) is a side view of the intermediate member 940 and FIG. 37(c) is a view of the intermediate member 940 seen from a direction C.
Figure 38:
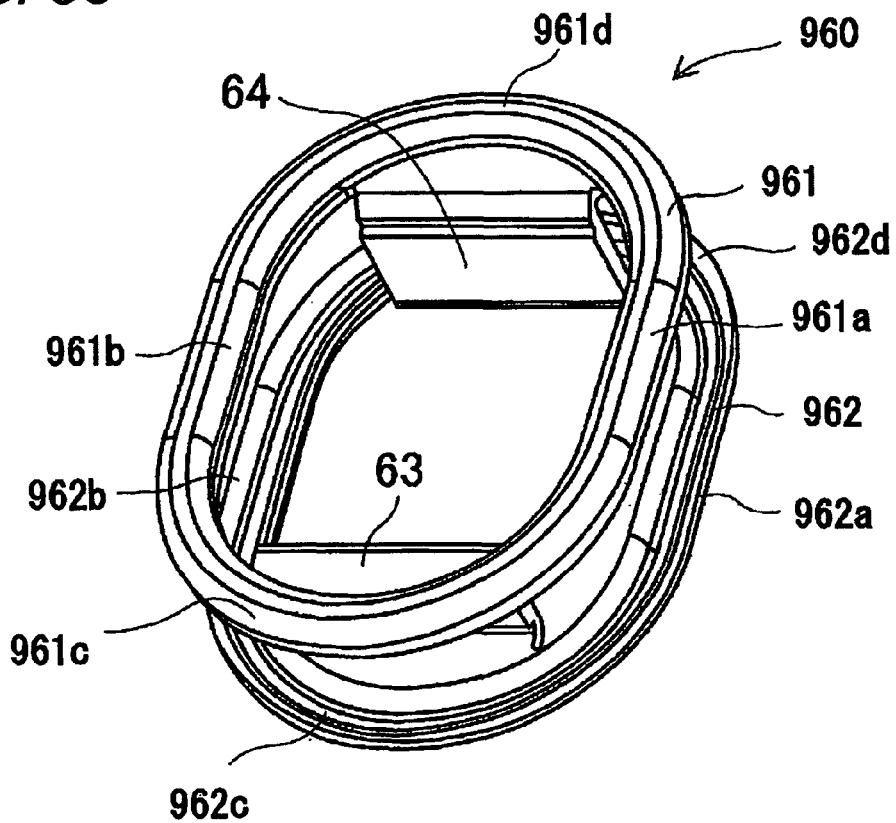
FIG. 38 is a perspective view of a cage 960.
Figure 39:
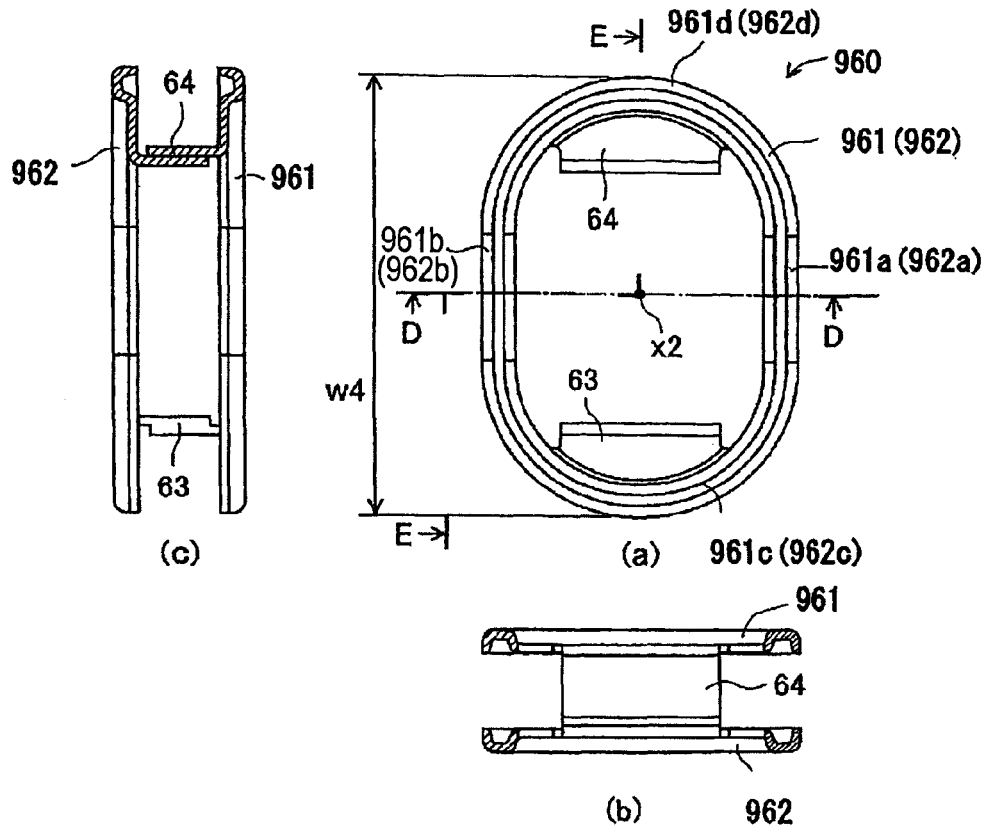
FIG. 39(a) is a plan view of the cage 960.
FIG. 39(b) is a sectional view of the cage 960 taken along a line D-D (a sectional view of a minor axis side) and FIG. 39(c) is a sectional view of the cage 960 taken along a line E-E (a diagram including a partial section of a major axis side).

A constant velocity joint 901 of a ninth exemplary embodiment will be described by referring FIGS. 34 to 39. The same parts as those of the first exemplary embodiment are designated by the same reference numerals and an explanation thereof will be omitted. FIG. 34 is a perspective view of a roller unit 930. FIG. 35(a) is a plan view of the roller unit 930, FIG. 35(b) is a sectional view of the roller unit 930 taken along a line A-A (a sectional view of a minor axis side) and FIG. 35(c) is a partly sectional view of the roller unit 930 taken along a line B-B (a diagram including a partial section of a major axis side). FIG. 36 is one perspective view of a pair of intermediate members 940. FIG. 37(a) is a front view of the intermediate member 940, FIG. 37(b) is a side view of the intermediate member 940 and FIG. 37(c) is a view of the intermediate member 940 seen from a direction C. FIG. 38 is a perspective view of a cage 960. FIG. 39(a) is a plan view of the cage 960, FIG. 39(b) is a sectional view of the cage 960 taken along a line D-D (a sectional view of a minor axis side) and FIG. 39(c) is a sectional view of the cage 960 taken along a line E-E (a diagram including a partial section of a major axis side).

An outer form of an intermediate member 940 is configured substantially in a rectangular shape as an entire form. Further, when the intermediate member 940 is observed as a whole, a part corresponding to a circular hole is formed in a center of the intermediate member 940. A center X1 of the circular hole is located at a position shifted by W1 to an opening side of an outer ring 10 from a central part X2 of a width W2 in the direction of a rotation axis of the outer ring 10 in the intermediate member 940. The center X1 of the circular hole is a position of a central axis (a tripod axis) of tripod shaft parts 22 at a position of a joint angle of 0 deg. Further, the center X1 of the circular hole is located at a central part of a width W5 in the direction of the rotation axis of the outer ring 10 in below-described intermediate members 940a and 940b. Further, the central part X2 of the width W2 coincides with a central part of a width W3 in the direction of the rotation axis of the outer ring 10 in a below-described power transmission surface 942 and coincides with a central part of a width W4 in the direction of the rotation axis of the outer ring 10 in a below-described cage 960.

The intermediate member 940 includes a pair of members 940a and 940b. The one pair of intermediate members 940a and 940b are formed by separate members so as to have symmetrical forms relative to a plane passing thorough the tripod axis and a rotation axis of an intermediate shaft and respectively independent. The one pair of intermediate members 940a and 940b are arranged, as in the first exemplary embodiment shown in FIG. 2, so as to sandwich the tripod shaft parts 22 from both sides of side surfaces of raceway grooves 11. Namely, both the intermediate members 940a and 940b are arranged so as to sandwich the tripod shaft parts 22 from both sides in a power transmitting direction (a direction on the rotation axis of the outer ring or on the rotation axis of the intermediate shaft). The one pair of intermediate members 940a and 940b are provided so as to oscillate in the direction of the rotation axis of the outer ring 10 relative to the tripod shaft parts 22 and oscillate in the circumferential direction of the outer ring 10.

A detailed form of each of the intermediate members 940a and 940b will be described by referring to FIG. 36 and FIGS. 37(a) to 37(c). The surface of each of the intermediate members 940a and 940b includes a tripod contact surface 941, a power transmission surface 942 and axial end faces 944 and 945. Here, when the one pair of intermediate members 940a and 940b are seen as one body, the tripod contact surfaces 941 form an inner surface and the power transmission surfaces 42 and the axial end faces 944 and 945 form an outer surface.

The tripod contact surface 941 is formed in a partly spherically recessed shape to come into contact with the tripod shaft parts 22 so as to oscillate in the axial direction of the outer ring 10 and in the circumferential direction of the outer ring 10. A vertical width of the tripod contact surface 941 in FIG. 37(b) (a width in the axial direction of the outer ring 10 in the intermediate member 940) is W5. A center of a spherical surface in the tripod contact surface 941 is located at a center of a transverse width (the thickness of the intermediate member 940) of the tripod contact surface 941 shown in FIG. 37(a) and shifted downward from a center of a vertical width (a width in the axial direction of the outer ring 10 in the intermediate member 940) shown in FIG. 37(b). Namely, the center of the spherical surface in the tripod contact surface 941 is located on X1 in FIG. 37(b). The X1 coincides with the central axis X1 of the tripod shaft parts 22 at the joint angle of 0 deg as described in FIG. 35.

The power transmission surface 942 is provided in a back surface side of the tripod contact surface 941, that is, in the right side in FIG. 37(b). The power transmission surface 942 is formed in a planar and rectangular shape. The intermediate members 940a and 940b are respectively arranged so that the power transmission surfaces 942 are parallel to the side surfaces of the raceway grooves 11. Namely, under a position that the rotation axis of the outer ring 10 coincides with the rotation axis of the intermediate shaft (a joint angle of 0 deg), the power transmission surfaces 942 are parallel to the plane passing thorough the central axis of the tripod shaft parts 22 and the rotation axis of the intermediate shaft. Further, the power transmission surface 942 is located at a central part in the vertical direction shown in FIG. 37(b) and has a width about ⅔ times as long as the vertical width W2 of the intermediate members 940a and 940b shown in FIG. 37(b). Namely, in the back surface side of the deepest part of the tripod contact surface 941, the power transmission surface 942 is located. A center in the vertical width W3 in the power transmission surface 942 in FIG. 37(b) is located on X2 in FIG. 37(b). Namely, the X2 is shifted by W1 from the center X1 of the spherical surface in the tripod contact surface 41. Further, the power transmission surface 942 has a range where the power transmission surface may come into contact with a plurality of rolling elements 50 (three to four rolling elements in this exemplary embodiment).

The axial end faces 944 and 945 are parts located at both ends in upper and lower parts in FIG. 37b). Both the axial end faces 944 and 945 are formed with planes orthogonal to the power transmission surface 942. Namely, the axial end faces 944 and 945 are formed with planes orthogonal to the side surfaces of the raceway grooves 11. A clearance between the axial end faces 944 and 945 is W2. That is, the clearance corresponds to a longitudinal width of the intermediate members 940a and 940b. A central part of the clearance W2 of the axial end faces 944 and 945 is located on X2 in FIG. 37(b).

A circulating path forming member 961 includes opposed straight line parts 961a and 961b and semi-circular arc shaped bent parts 961c and 961d for connecting the straight line parts 961a and 961b. Further, another circulating path forming member 962 includes straight line parts 962a and 962b and bent parts 962c and 962d similarly to the above-described circulating path forming member 961.

A vertical width (a width in the axial direction of the outer ring 10 in the cage 960) in the circulating path forming members 961 and 962 in FIG. 39(a) is W4. A central part of the width W4 is located on X2 shown in FIG. 39(b).

One pair of connecting parts 63 and 64 respectively connect together central parts (upper and lower end parts in FIG.39(a))in the circumferential direction of the bent parts 961c and 961d, 962c and 962d of the one pair of circulating path forming members 961 and 962. Namely, as shown in FIG. 39(c), a part between the one pair of circulating path forming members 961 and 962 is opened except the connecting parts 63 and 64.

The connecting parts 63 and 64 are configured in U shaped forms opened outward the cage 960. Bottom surfaces opposite to opening sides of the U shaped forms of the connecting parts 63 and 64 (an inner side of the cage 960) are formed to be flat. The bottom surfaces opposite to the opening sides of the U shaped forms of the one pair of connecting parts 63 and 64 are provided so as to be parallel and opposed to each other. A clearance between the bottom surfaces opposite to the opening sides of the U shaped forms of the one pair of connecting parts 63 and 64 substantially coincides with a distance between the axial end faces 944 and 945 of the intermediate members 940a and 940b respectively. Bottom surfaces and opening sides (an outer side of the cage 960) of the U shaped forms of the connecting parts 63 and 64 are formed to be flat in parallel with the bottom surfaces opposite to the opening sides of the U shaped forms.

Further, one of end parts of the opening sides of the U shaped forms of the connecting parts 63 and 64 are respectively connected to the central parts in the circumferential direction of the bent parts 961c and 961d of the circulating path forming member 961 and the other of the end parts are respectively connected to the central parts in the circumferential direction of the bent parts 962c and 962d of the circulating path forming member 962.

Further, both end parts of the bent parts 961c and 961d, 962c and 962d of the one pair of circulating path forming members 961 and 962 are arranged so as to define introducing surfaces formed on both end parts of the power transmission surfaces 942 of the intermediate members 940a and 940b. Namely, the circulating paths formed by both the end parts of the bent parts 961c and 961d, 962c and 962d form circulating paths when the rolling elements 50 move on the introducing surfaces. The circulating paths are connected to the circulating paths formed by the straight line parts 961a, 961b, 962a and 962b so as to be smoothly continuous to thereto. Further, clearances are formed between both the end parts of the bent parts 961c, 961d, 962c and 962d forming the circulating paths and the introducing surfaces. It is to be understood that clearances are formed between both the end parts of the bent parts 961c, 961d, 962c and 962d forming the circulating paths and the side surfaces of the raceway grooves 11.

Figure 40:
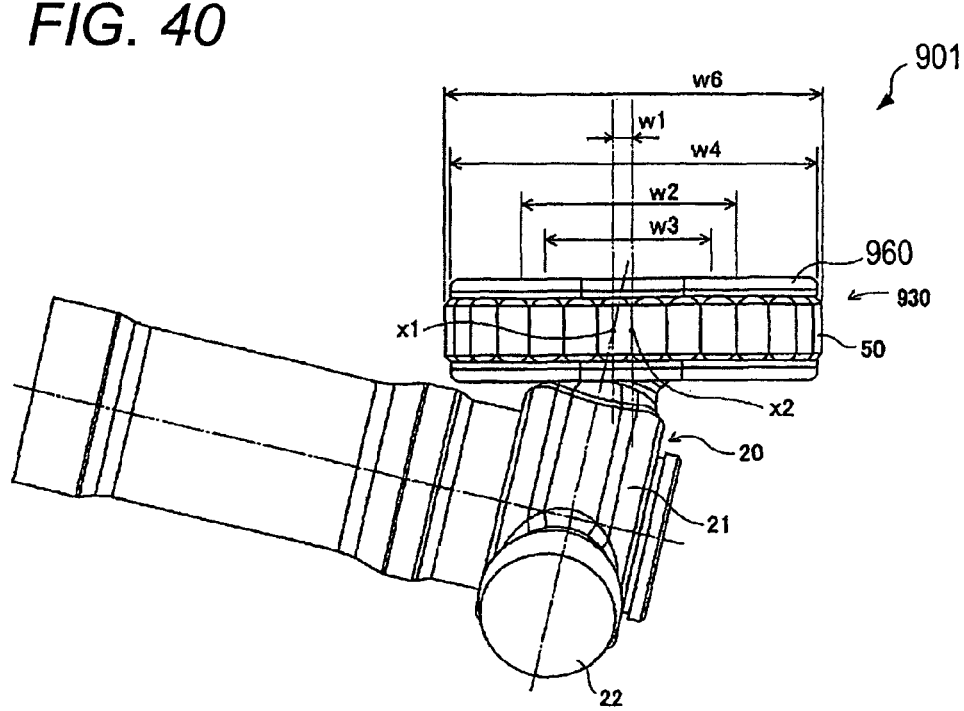
FIG. 40 is a sectional view seen from a direction orthogonal to a rotation axis of an outer ring 10 in an attached state of a part of a constant velocity joint 901.

Now, an operation of the above-described constant velocity joint 901 will be described by referring to FIG. 40. FIG. 40 is a side view showing a state that a joint angle is taken and the outer ring 10 is removed for the purpose of a simple explanation in the attached constant velocity joint 901. In FIG. 40, a left side shows an opening side of the outer ring 10 and a right side shows an interior side of the outer ring 10.

When the tripod shaft parts 22 are reciprocated in the extending direction of the raceway grooves 11, a roller unit 930 arranged in an outer peripheral side of the tripod shaft parts 22 is also reciprocated. In the reciprocating movement of the roller unit 930, when the roller unit 930 is located at a position of a most interior side of the outer ring 10 as shown in FIG. 40, the intermediate shaft comes closest to the cage 960 of the roller unit 930. Here, when the cage 960 interferes with the intermediate shaft at a prescribed joint angle, an angle immediately before the interference arises is a maximum joint angle which can be taken by the outer ring 10 and the intermediate shaft.

Here, the center X1 of the part of the one pair of intermediate members 940 corresponding to the circular hole is shifted by W1 to the opening side of the outer ring 10 from the central part X2 in a width W6 of the roller unit 930 in the axial direction of the outer ring, the width W4 of the cage 960 in the axial direction of the outer ring, the width W2 of the intermediate members 940a and 940b in the axial direction of the outer ring and the width W3 of the power transmission surface 942 in the axial direction of the outer ring. Accordingly, the roller unit 930 is located to be entirely shifted by W1 to the interior side of the outer ring 10 from the central axis X1 of the tripod shaft parts 22. Thus, as shown in FIG. 40, since the cage 960 located in the outermost side of the roller unit 30 moves to the interior side of the outer ring 10, the intermediate shaft can take the more an angle.

<Modification of Ninth Exemplary Embodiment>

In the above-described ninth exemplary embodiment, the tripod contact surfaces 941 of the one pair of intermediate members 940a and 940b have the spherically recessed shapes. Otherwise, the tripod contact surfaces 941 of the one pair of intermediate members 940a and 940b may be formed in cylindrical surfaces. Additionally, the intermediate member 940 is not formed with separate members so as to have a pair, but may be integrally formed. Namely, the integrally formed intermediate member 940 is arranged so as to cover the tripod shaft parts 22 and the cage 960 is arranged outside the intermediate member. Thus, the intermediate member formed integrally with the tripod shaft parts 22 can slide.

In such a structure, the tripod shaft parts 22 may have a range in which the tripod shaft parts 22 can slide enlarged relative to the roller unit 930. Even when a joint angle is applied to increase an amount that the tripod shaft parts 22 slide, the above-described effects can be maintained and a power can be transmitted at the same time. Further, in accordance with the above-described structure, a structure may be used that can suppress a slide between rolling elements 50 and the intermediate member as the integral member. Further, when the intermediate member is integrally formed, a constant velocity joint is excellent in its productivity or simple attachment. However, when the intermediate member 940 is formed with one pair of independent members, the generation of an induced thrust force can be reduced. Namely, in order to decrease a width of the roller unit 930 in the direction of the rotation axis of the outer ring 10, a sufficient size of the power transmission surface is ensured without shortening a block for transmitting a power and enlarging the outside diameter of the outer ring 10.

<Tenth Exemplary Embodiment>

Figure 41:
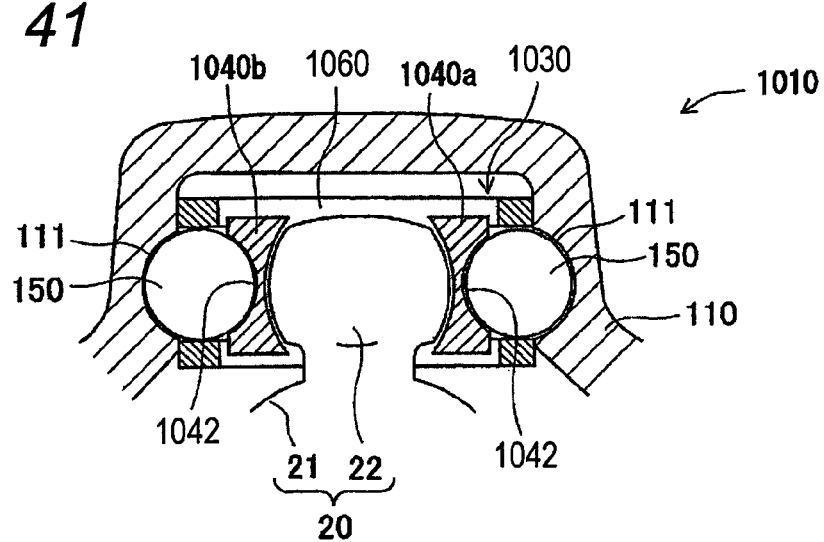
FIG. 41 is a radially sectional view of a part of a constant velocity joint 1001 of a tenth exemplary embodiment.

Now, a constant velocity joint 1001 of a tenth exemplary embodiment will be described by referring to FIG. 41 to FIG. 42. The same parts as those of the second exemplary embodiment are designated by the same reference numerals and an explanation thereof will be omitted. FIG. 41 is a view of a constant velocity joint 1001 excluding an outer ring seen from the direction of a tripod axis.

Figure 42:
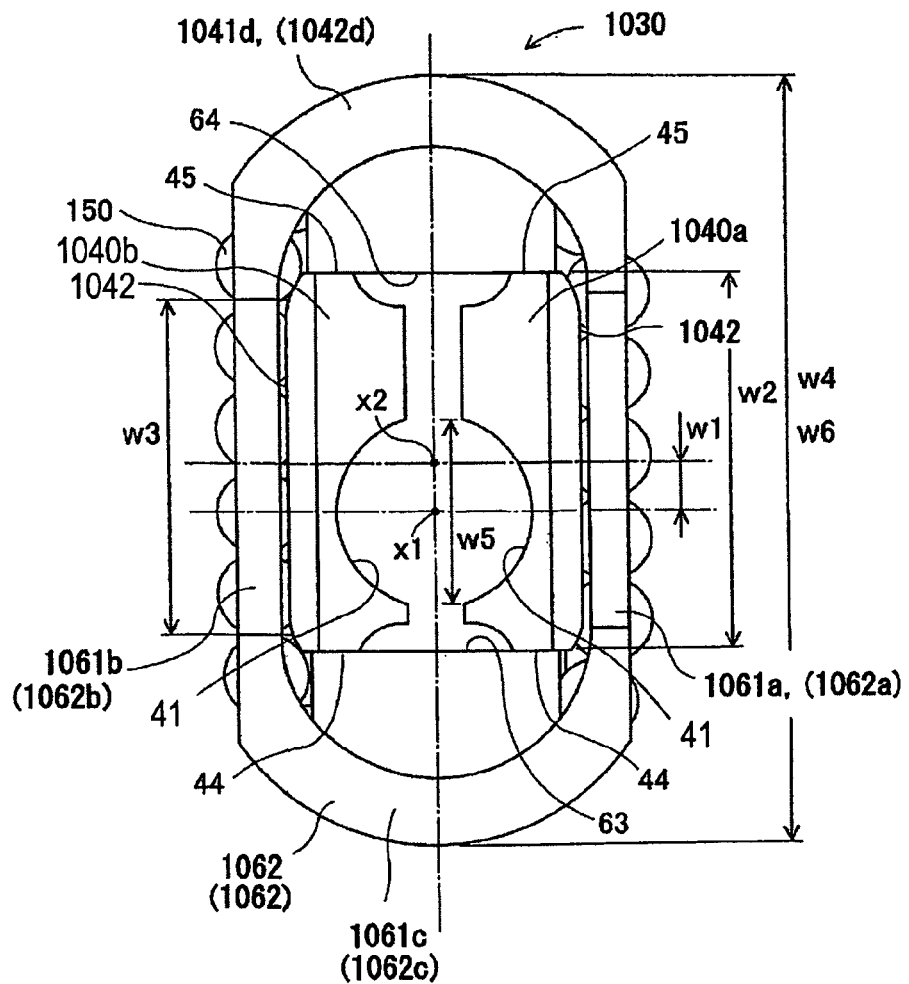
FIG. 42 is a diagram seen from an axial direction of a tripod of the constant velocity joint 1001 excluding an outer ring.

As shown in FIG. 41 and FIG. 42, the constant velocity joint 1001 includes an outer ring 110, a tripod 20 and a roller unit 1030. Here, the constant velocity joint 1001 of the tenth exemplary embodiment is mainly different in view of a point that the rolling element 150 of the constant velocity joint 901 of the ninth exemplary embodiment is changed from the needle to a spherical member. In accordance therewith, the forms of side surfaces of raceway grooves 111 of the outer ring 110 and configurations of outer surfaces of one pair of intermediate members 1040 are different from those of the constant velocity joint 901 of the ninth exemplary embodiment. Since the tripod 20 is the same as the tripod 20 of the first exemplary embodiment, a detailed explanation thereof will be omitted. Only different points will be described below.

The intermediate member 1040 includes one pair of intermediate members 1040a and 1040b. As shown in FIG. 41, power transmission surfaces 1042 of the one pair of intermediate members 1040a and 1040b have recessed grooves formed so as to define spherical surfaces of rolling elements 150 as spherical members. Other structures of the power transmission surface 1042 are the same as those of the ninth exemplary embodiment. Further, in order to ensure a sufficient power transmission by the rolling elements 150 as the spherical members, a vertical width W3 of the power transmission surface 1042 in FIG. 42 is larger than that of the ninth exemplary embodiment.

A cage 1060 has an annular shape as an entire form similarly to the case that the rolling element is the needle. While the circulating path forming members 1061 and 1062 that form the cage 1060 of the first exemplary embodiment are respectively configured in U shaped forms, circulating path forming members 1061 and 1062 of the cage 1060 of the tenth exemplary embodiment are arranged so as to be opposed in the vertical direction in FIG. 41 and provided with circular arc recessed grooves so as to support the spherical rolling elements 150. Further, in accordance with the enlargement of the width W3, a width W4 of the cage 1060 in the axial direction of the outer ring is also larger than that of the ninth exemplary embodiment.

In the cage 1060 of the tenth exemplary embodiment, bent parts 1061c and 1062c of an opening side of the outer ring and bent parts 1061d and 1062d of an interior side of the outer ring which do not contribute to a power transmission are not provided with opening parts in order to more assuredly hold and circulate the rolling elements 150. Accordingly, in the tenth exemplary embodiment, a vertical width W6 in the axial direction of the outer ring in the roller unit 1030 in FIG. 42 is equal to W4.

Figure 43:
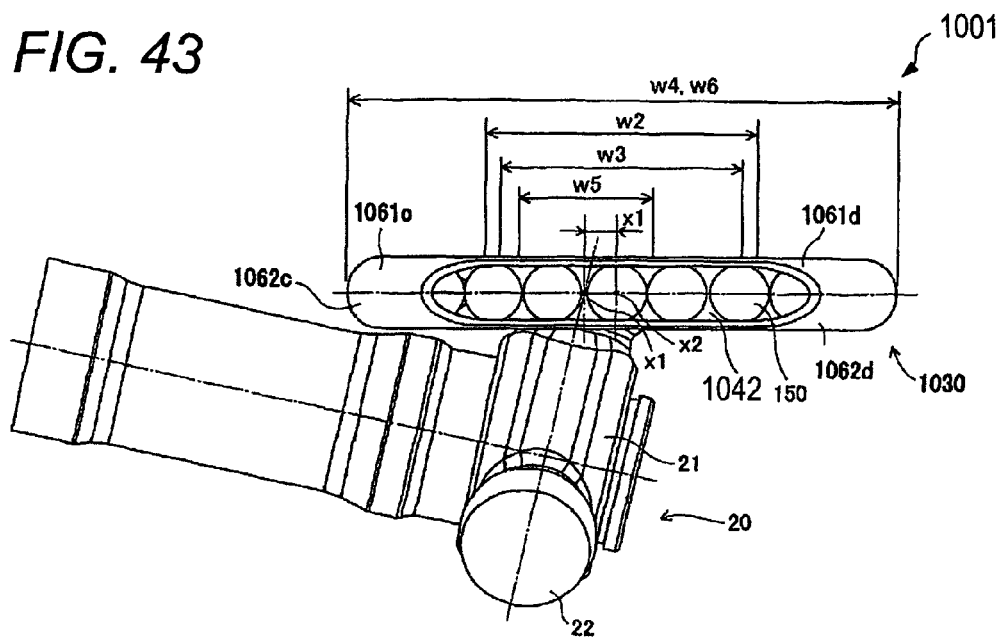
FIG. 43 is a diagram seen from a direction orthogonal to a rotation axis of the outer ring of the constant velocity joint 1001 excluding the outer ring.

Now, an operation of the above-described constant velocity joint 1001 will be described by referring to FIG. 43. FIG. 43 is a side view showing a state that a joint angle is taken and the outer ring 110 is removed for the purpose of a simple explanation in the attached constant velocity joint 1001. In FIG. 43, a left side shows the opening side of the outer ring 110 and a right side shows the interior side of the outer ring 110.

In the constant velocity joint 1001, differently from the case that the rolling element 150 is the needle, the spherical surfaces of the rolling elements 150 abut on the circular arc recessed grooves of the intermediate members 1040a and 1040b respectively and the rolling elements 150 are circulated on outer peripheries of the intermediate members 1040a and 1040b to transmit a power.

Further, as described in the ninth exemplary embodiment, during a power transmission, the roller unit 1030 is reciprocated in the extending direction of the raceway grooves 111. In the reciprocating movement of the roller unit 1030, when the roller unit 1030 is located at a position of a most interior side of the outer ring 110 as shown in FIG. 43, an intermediate shaft comes closest to the cage 1060 of the roller unit 1030. Here, when the cage 1060 interferes with the intermediate shaft at a prescribed joint angle, an angle immediately before the interference arises is a maximum joint angle which can be taken by the outer ring 110 and the intermediate shaft.

Here, the center X1 of a part of the one pair of intermediate members 1040 corresponding to a circular hole is shifted by W1 to the opening side of the outer ring 110 from the central part X2 in the width W6 of the roller unit 1030 in the axial direction of the outer ring, the width W4 of the cage 1060 in the axial direction of the outer ring, the width W2 of the intermediate members 1040a and 1040b in the axial direction of the outer ring and the width W3 of the power transmission surface 1042 in the axial direction of the outer ring. Accordingly, the roller unit 1030 is located to be entirely shifted by W1 to the interior side of the outer ring 110 from the central axis X1 of the tripod shaft parts 22.

Thus, as shown in FIG. 43, since the cage 1060 located in the outermost side of the roller unit 1030 moves to the interior side of the outer ring 110, the intermediate shaft can take the more an angle. Namely, a sufficient size of the power transmission surface is ensured without shortening a block for transmitting a power and enlarging the outside diameter of the outer ring 110 to decrease a width of the roller unit 1030 in the direction of the rotation axis of the outer ring 110.

Further, the rolling element 150 as the spherical member is high in its rigidity and excellent in its circulating property. Further, the spherical member having the small number of working processes is relatively easily produced and an attachment of the constant velocity joint 1001 can be simplified.

<Eleventh Exemplary Embodiment>

Figure 44:
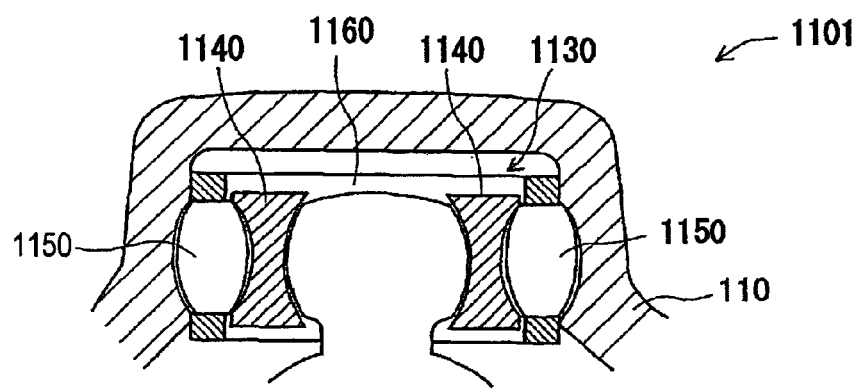
FIG. 44 is a perspective view in an attached state of a part of a constant velocity joint 1101 of an eleventh exemplary embodiment.

Now, a constant velocity joint 1101 of an eleventh exemplary embodiment will be described below by referring to FIG. 44. FIG. 44 is a radially sectional view of a part of the constant velocity joint 1101 of the eleventh exemplary embodiment. As shown in FIG. 44, the constant velocity joint 1101 includes an outer ring 110, a tripod 20 and a roller unit 1130. Here, the constant velocity joint 1101 of the eleventh exemplary embodiment is different in view of a point that the rolling element 150 of the constant velocity joint 1001 of the tenth exemplary embodiment is changed from the spherical member to a barrel shaped roller. Only different points will be described below.

Namely, the roller unit 1130 includes an intermediate member 1140, a plurality of rolling elements 1150 and a cage 1160. The rolling element 1150 is the barrel shaped roller and a plurality of rolling elements are arranged so as to circulate on an outer periphery of the intermediate member 1140 as in the case of the spherical member and the needle. The barrel shaped roller is the rolling element that has a pillar shape and in which a section cut in the direction orthogonal to the extending direction of the pillar is circular and a part corresponding to an outer peripheral surface in the section cut in the extending direction of the pillar has a circular arc protruding shape.

In accordance with such a structure, similarly to the rolling member 150 in the tenth exemplary embodiment, a maximum joint angle can be increased and a width of the pillar in the direction orthogonal to the extending direction of the pillar can be decreased more than that of the spherical member. As a result, an entire part of the constant velocity joint 1101 can be made to be compact.

It is to be understood that the present invention can be variously changed within a range where the gist of the present invention is not changed. The present invention is described in detail by referring to specific exemplary embodiments, however, it is to be understood to a person with ordinary skill in the art that various changes or modifications can be made without departing the spirit, the scope or the scope of intention of the present invention.

The present invention is based on three Japanese patent applications (Application No. 2008-164967, Application No. 2008-164978, Application No. 2008-165016) filed on Jun. 24, 2008 and the contents thereof are incorporated herein as references.

Industrial Applicability

According to the present invention, the generation of an induced thrust force caused by a slide of a member from raceway grooves that abuts on the raceway grooves of an outer ring. Further, according to the present invention, a maximum joint angle can be increased without enlarging the outside diameter of the outer ring.

Description of Reference Symbols 1, 101, 201, 301, 401, 501, 601, 701, 801, 901, 1001, 1101: constant velocity joint
  10, 110: outer ring
  11, 111: raceway groove
  12: engaging protrusion
  13: rotation axis of outer ring
  20: tripod
  21: boss part
  21a: inner peripheral spline
  22: tripod shaft part
  23: rotation axis of intermediate shaft
  30, 130: roller unit
  40, 140, 540, 940, 1040, 1140: intermediate member
  40a, 40b, 140a, 140b, 540a, 540b, 940a, 940b, 1040a, 1040b, 1140a, 1140b: each intermediate member
  41, 941: tripod contact surface
  42, 142, 942: power transmission surface
  43, 143: intermediate member introducing surface
  44, 45, 944, 945: axial end face
  50, 150, 250, 1150: rolling element
  51: cylindrical part
  52: small diameter shaft part
  60, 160, 560, 660, 760, 860, 960, 1060, 1160: cage
  61, 62, 161, 162, 561, 562, 661, 662, 761, 762, 861, 862, 961, 962, 1061, 1062: circulating path forming member
  61a, 61b, 961a, 961b, 1061a, 1061b: straight line part
  61c, 61d, 961c, 961d, 1061c, 1061d: bent part
  561a, 562a, 761a, 762a, 861a, 862a: first circulating path
  561b, 562a, 761b, 762a, 861b, 862b: second circulating path
  561c, 562a, 761c, 762a, 861c, 862c: third circulating path
  561d, 562a, 661d, 662a, 761d, 762d, 861d, 862d: fourth circulating path
  63, 64: connecting part
  302: outer ring PCR
  303: tripod PCR
  304: intersection
  305: center of curvature
  306: reference load point
  307: first load point
  308: second load point

The invention claimed is:

1. A sliding type tripod constant velocity joint comprising:
an outer ring of a tubular form having three raceway grooves which are formed on an inner peripheral surface and which extend in a direction of a rotation axis of the outer ring;
a tripod including a boss part connected to a shaft and three tripod shaft parts which are provided upright so as to extend outward in a radial direction of the boss part from an outer peripheral surface of the boss part and which are inserted into the raceway grooves, respectively;
a pair of intermediate members which are arranged so as to sandwich a corresponding one of the tripod shaft parts from both sides of side surfaces of the raceway grooves and which are provided so as to be oscillated relative to the corresponding one of the tripod shaft parts;
a plurality of rolling elements provided between the side surfaces of a corresponding one of the raceway grooves and power transmission surfaces of the pair of intermediate members opposing the side surfaces to the corresponding one of the raceway grooves so as to roll along the side surfaces of the corresponding one of the raceway grooves; and
a cage that supports the rolling elements such that the rolling elements circulate on outer peripheries of the pair of intermediate members,
wherein the cage regulates a relative operation of the intermediate members in an axial direction of the outer ring,
wherein a gap is formed between the pair of intermediate members, and
wherein the cage is disposed so as to circulate the rolling elements from one intermediate member of the pair of intermediate members to another intermediate member of the pair of intermediate members across the gap formed between the pair of intermediate members, the rolling elements being circulated so as to not contact either of the pair of intermediate members while being circulated across a portion of the gap.

2. The sliding type tripod constant velocity joint according to claim 1,
wherein the pair of intermediate members have intermediate introducing surfaces which are smooth with respect to the power transmission surfaces so as to smoothly contact and guide the circulating rolling elements to the power transmission surfaces.

3. The sliding type tripod constant velocity joint according to claim 2,
wherein a circulating path as a track of the rolling elements circulated in the cage includes:
a first circulating path where the rolling elements move on the power transmission surfaces and which is defined along the power transmission surfaces;
a second circulating path where the rolling elements move on the intermediate member introducing surfaces and which is defined along the intermediate member introducing surfaces and is smoothly connected to the first circulating path; and
a third circulating path smoothly connected to side end parts of the second circulating path opposite to the first circulating path.

4. The sliding type tripod constant velocity joint according to claim 1, wherein the cage is not regulated in a power transmitting direction relative to the one pair of intermediate members.

5. The sliding type tripod constant velocity joint according to claim 1,
wherein the outer peripheral surfaces of the tripod shaft parts have spherically protruding shapes, and
wherein the inner surfaces of the one pair of intermediate members are fitted to the outer peripheral surfaces of the tripod shaft parts.

6. The sliding type tripod constant velocity joint according to claim 1,
wherein the rolling element comprises a cylindrical needle, and
wherein under a state where a rotation axis of the outer ring coincides with a rotation axis of, the shaft, the cage supports the needle such that a cylindrical axial direction of the needle is parallel to an axial direction of the tripod, and such that the pair of intermediate members form the power transmission surfaces which can slide in a radial direction of the outer ring relative to the needle.

7. The sliding type tripod constant velocity joint according to claim 1,
wherein the rolling element is comprises a spherical or barrel shaped roller, and
wherein under a state that a rotation axis of the outer ring coincides with a rotation axis of the shaft, the pair of intermediate members are provided with the power transmission surfaces which can be oscillated in a radial direction of the outer ring relative to the rolling elements.

8. A sliding type tripod constant velocity joint comprising:
an outer ring of a tubular form having three raceway Grooves which are formed on an inner peripheral surface and which extend in a direction of a rotation axis of the outer ring:
A tripod Including a boss part connected to a shaft and three tripod shaft parts which are provided upright so as to extend outward in a radial direction of the boss part from an outer peripheral surface of the boss part and which are inserted into the raceway grooves, respectively;
A pair of Intermediate members which are arranged so as to sandwich a corresponding one of the tripod shaft parts from both sides of side surfaces of the raceway grooves and which are provided so as to be oscillated relative to the corresponding one of the tripod shaft parts;
a plurality of rolling elements provided between the side surfaces of a corresponding one of the raceway grooves and power transmission surfaces of the pair of intermediate members opposing the side surfaces to the corresponding one of the raceway grooves so as to roll along the side surfaces of the corresponding one of the raceway grooves: and
a cage that supports the rolling elements such that the rolling elements circulate on outer peripheries of the pair of intermediate members,
wherein the cage regulates a relative operation of the intermediate members in an axial direction of the outer ring,
wherein the pair of intermediate members have intermediate introducing surfaces which include a curved surface, and
wherein a portion of the cage extending from one of the pair of intermediate members to an other of the intermediate members has an arc shape such that the rolling elements smoothly enter the portion of the cage from the curved surface of the intermediate introducing surfaces of the pair of intermediate members.

* * * * *